United States Patent [19]

Barrows

[11] Patent Number: 5,545,042
[45] Date of Patent: Aug. 13, 1996

[54] LEARNING BOARD IN COMBINATION WITH SOLUTION LISTS

[76] Inventor: Irvin R. Barrows, P.O. Box 1234, St. Ann, Mo. 63074-5234

[21] Appl. No.: 965,669

[22] Filed: Oct. 20, 1992

[51] Int. Cl.⁶ .................................................. G09B 1/16
[52] U.S. Cl. ............................ 434/207; 434/209; 434/191
[58] Field of Search .................................... 434/333, 327, 434/346, 191, 96, 188, 207, 209, 128, 347; 273/272, 282.1, 281, 299

[56] References Cited

U.S. PATENT DOCUMENTS

| | | | |
|---|---|---|---|
| 1,359,115 | 11/1920 | Sittinger | 434/333 |
| 2,481,109 | 9/1949 | Grace | 434/333 |
| 2,871,581 | 2/1959 | Gukak | 434/209 X |
| 2,875,531 | 3/1959 | Mansfield | 434/333 X |
| 2,899,756 | 8/1959 | Wise | 35/31 |
| 2,954,616 | 10/1960 | Mogard | 434/333 |
| 3,212,201 | 10/1965 | Tensen | 35/31 |
| 3,242,594 | 3/1966 | Smith | 35/26 |
| 3,403,460 | 10/1968 | Barrows | 434/333 |
| 3,452,455 | 7/1969 | Judge | 35/31 |
| 3,455,033 | 7/1969 | Bing-Hou-Han | 35/31 |
| 3,456,364 | 7/1969 | Alexander | 35/31 |
| 3,461,572 | 8/1969 | Schmidt et al. | 35/31 |
| 3,486,245 | 12/1969 | Nelson | 35/31 |
| 3,491,460 | 1/1970 | Novak | 35/31 |
| 3,501,854 | 3/1970 | Hollingsworth | 35/31 |
| 3,504,449 | 4/1970 | Kobler et al. | 35/31 |
| 3,514,873 | 6/1970 | Stobbe | 35/31 |
| 3,521,383 | 7/1970 | Terwilleger | 35/31 |
| 3,523,376 | 8/1970 | Gillian et al. | 35/31 |
| 3,523,377 | 8/1970 | Gardner | 35/31 |
| 3,526,045 | 9/1970 | Stone | 35/31 |
| 3,526,973 | 9/1970 | Delves | 35/31 |
| 3,526,974 | 9/1970 | Van Derveer et al. | 35/31 |
| 3,541,707 | 11/1970 | Billingsley | 35/31 |
| 3,545,101 | 12/1970 | Fike | 434/191 X |
| 3,571,950 | 3/1971 | Walker | 35/31 |
| 3,571,953 | 3/1971 | Hassell | 35/31 |
| 3,593,434 | 7/1971 | McGarry | 434/333 |
| 3,827,160 | 8/1974 | Talbot | 434/333 X |
| 3,937,472 | 2/1976 | Rice | 434/333 X |
| 4,361,328 | 11/1982 | Stein et al. | 434/333 X |
| 4,695,257 | 9/1987 | Vawter | 434/333 |
| 5,167,509 | 12/1992 | Guffrey | 434/333 |

FOREIGN PATENT DOCUMENTS 911228 4/1954 Germany .
744637 2/1956 United Kingdom .

OTHER PUBLICATIONS

Educational Teaching Aids Catalogue About 10 Years Old Catalogue Cover & 4 Pages Photostated.

Primary Examiner—Gene Mancene
Assistant Examiner—Jeffrey A. Smith
Attorney, Agent, or Firm—Heller & Kepler

[57] ABSTRACT

A learning board preferably utilized for teaching both mathematics and non-mathematical subjects. The learning board comprising a playing surface with multiple receiving areas, a plurality of board pieces, a plurality of solution lists, and a plurality of indicia on the learning surface, the board pieces, and the solution lists. The plurality of indicia including question, answer, verification, number, solution, and indicator means. The learning board including a means for almost instantaneously verifying correct answers while substantially disorganizing the board pieces with respect to the subsequent exercise through the correct solution of an exercise.

62 Claims, 37 Drawing Sheets

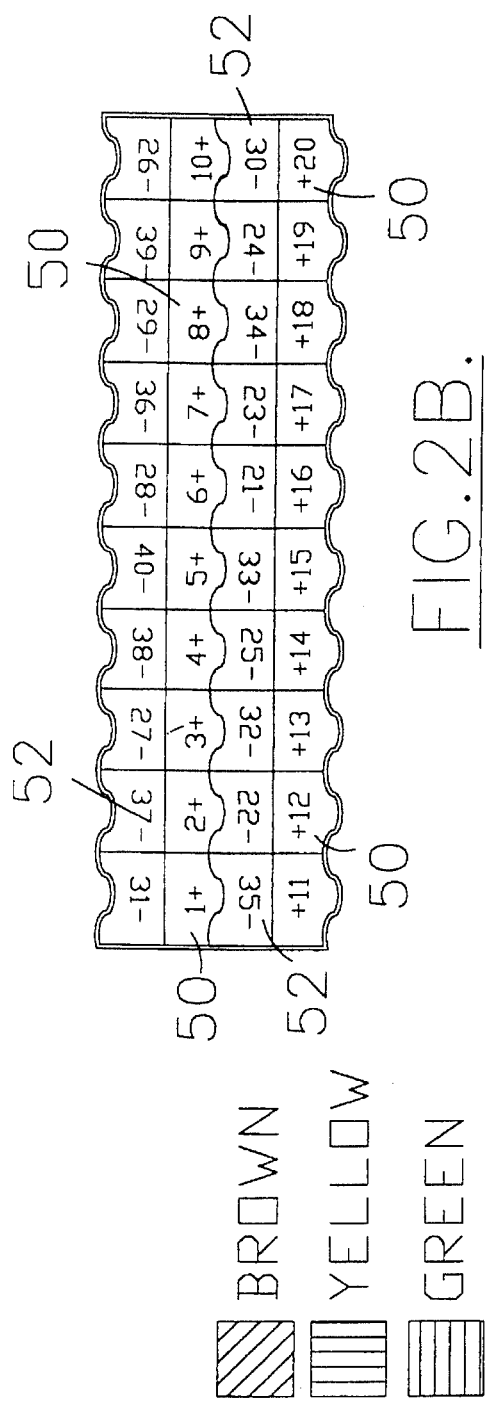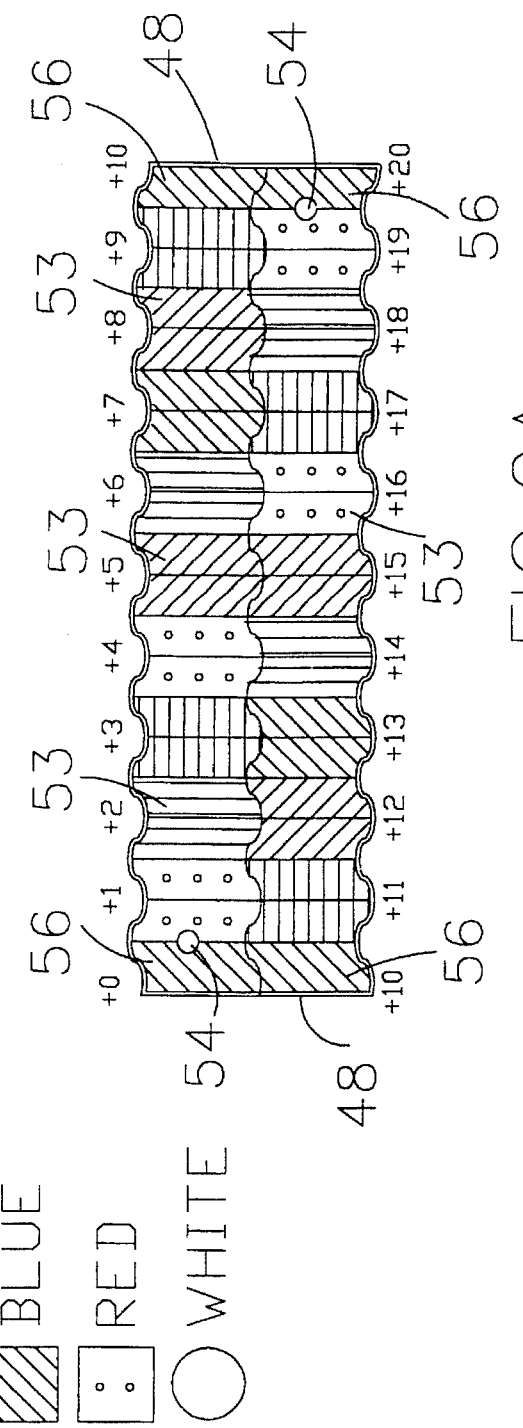
FIG.2B.
FIG.2A.

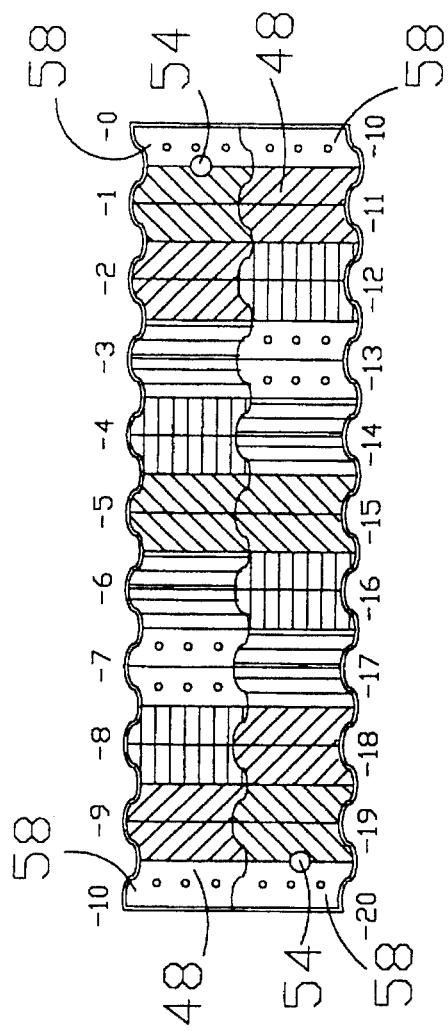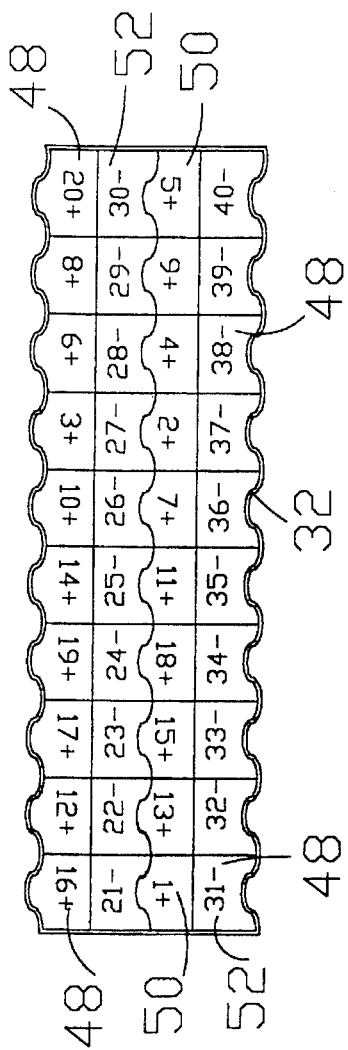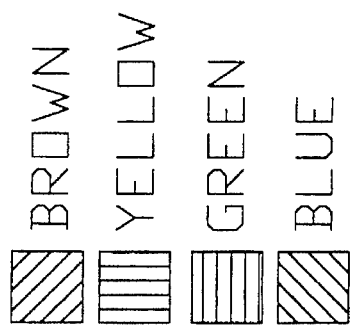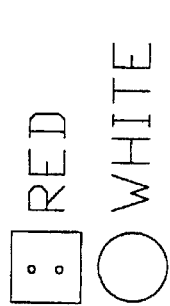
FIG.3A
FIG.3B

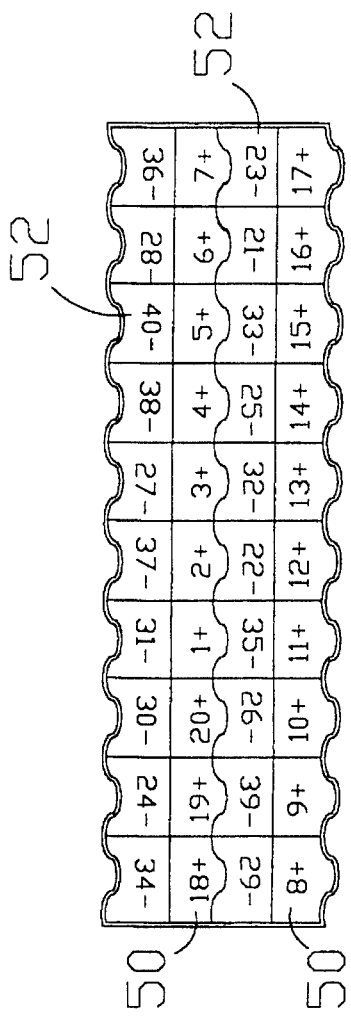
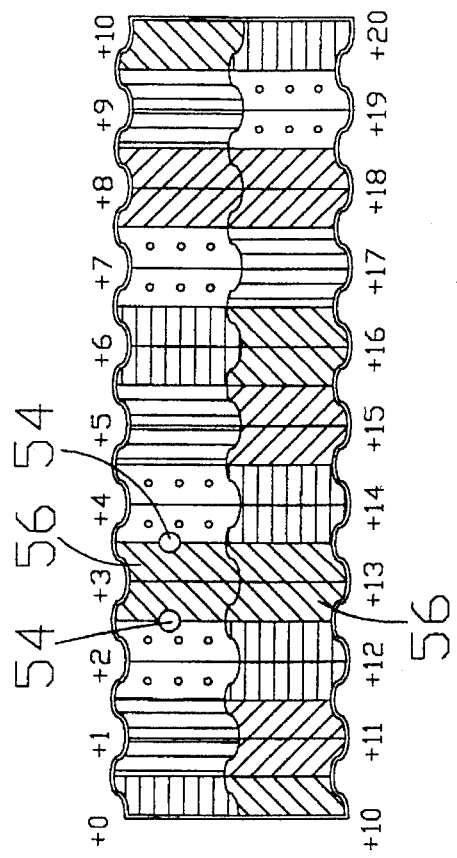
FIG.4B.
FIG.4A.

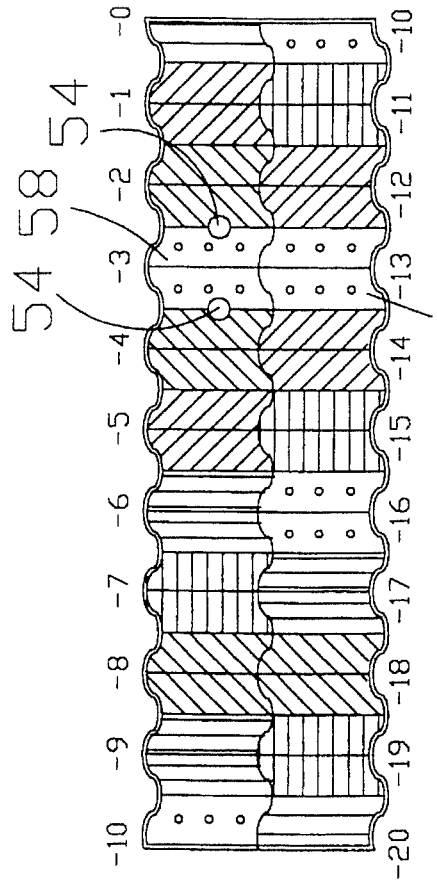
FIG.5A.
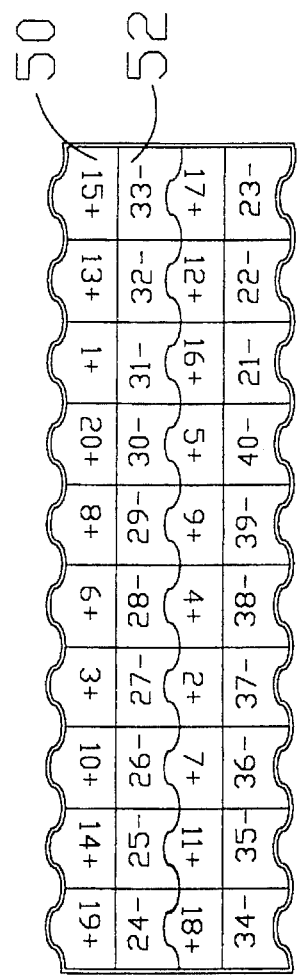
FIG.5B.
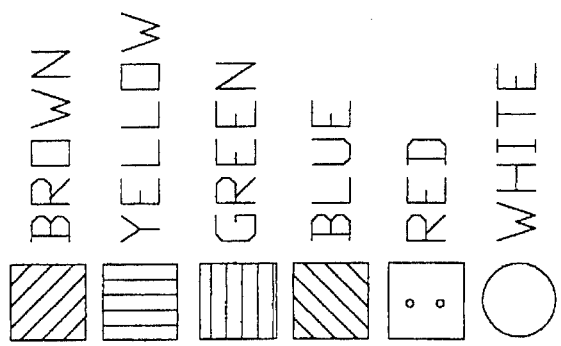

| 1 | 2 | 3 | 4 | 5 | 6 | 7 | 8 | 9 | 10 |
|---|---|---|---|---|---|---|---|---|---|
| 1C | 21I | 1B | 21C | 1N | 21N | 1O | 21F | 1P | 21R |
| 2D | 22J | 2C | 22R | 2I | 22Q | 2R | 22P | 2F | 22S |
| 3E | 23T | 3N | 23S | 3B | 23R | 3J | 23A | 3I | 23B |
| 4O | 24N | 4O | 24N | 4C | 24S | 4Q | 24B | 4E | 24P |
| 5P | 25O | 5P | 25O | 5K | 25G | 5H | 25M | 5N | 25E |
| 6J | 26E | 6K | 26P | 6L | 26H | 6I | 26T | 6H | 26A |
| 7T | 27F | 7L | 27G | 7M | 27A | 7N | 27L | 7K | 27D |
| 8A | 28G | 8G | 28H | 8P | 28P | 8D | 28O | 8L | 28N |
| 9Q | 29L | 9Q | 29D | 9Q | 29E | 9E | 29S | 9S | 29J |
| 10R | 30M | 10F | 30M | 10F | 30M | 10K | 30E | 10T | 30K |
| 11N | 31A | 11I | 31T | 11F | 31C | 11I | 31D | 11D | 31L |
| 12I | 32P | 12J | 32A | 12G | 32D | 12F | 32R | 12R | 32F |
| 13B | 33Q | 13H | 33I | 13T | 33O | 13T | 33G | 13O | 33G |
| 14S | 34C | 14M | 34F | 14A | 34T | 14A | 34H | 14A | 34H |
| 15K | 35D | 15S | 35I | 15S | 35L | 15S | 35Q | 15G | 35T |
| 16L | 36B | 16T | 36E | 16H | 36F | 16G | 36N | 16M | 36M |
| 17H | 37R | 17E | 37J | 17D | 37B | 17P | 37C | 17Q | 37Q |
| 18F | 38S | 18R | 38K | 18R | 38K | 18M | 38K | 18J | 38C |
| 19G | 39K | 19D | 39Q | 19J | 39I | 19B | 39I | 19B | 39I |
| 20M | 40H | 20A | 40B | 20O | 40I | 20C | 40I | 20C | 40O |
| Brown | Red | Yellow | Green | Blue | Brown | Red | Yellow | Green | Blue |
| 1 | 2 | 3 | 4 | 5 | 6 | 7 | 8 | 9 | 10 |

FIG.6A.

| 11 | 12 | 13 | 14 | 15 | 16 | 17 | 18 | 19 | 20 |
|---|---|---|---|---|---|---|---|---|---|
| 1M | 21S | 1L | 21M | 1D | 21D | 1E | 21P | 1F | 21H |
| 2N | 22T | 2M | 22H | 2S | 22G | 2H | 22F | 2P | 22I |
| 3O | 23J | 3D | 23I | 3L | 23H | 3T | 23K | 3S | 23L |
| 4E | 24D | 4E | 24D | 4M | 24I | 4G | 24L | 4O | 24F |
| 5F | 25E | 5F | 25F | 5A | 25Q | 5R | 25C | 5D | 25O |
| 6I | 26O | 6A | 26F | 6B | 26R | 6S | 26J | 6R | 26K |
| 7J | 27P | 7B | 27Q | 7C | 27K | 7D | 27B | 7A | 27N |
| 8K | 28Q | 8Q | 28R | 8F | 28F | 8N | 28E | 8B | 28D |
| 9G | 29B | 9G | 29N | 9G | 29O | 9O | 29I | 9I | 29T |
| 10H | 30C | 10P | 30C | 10D | 30C | 10A | 30O | 10J | 30A |
| 11D | 31K | 11S | 31J | 11P | 31M | 11B | 31N | 11N | 31B |
| 12S | 31F | 12T | 32K | 12Q | 32N | 12P | 32H | 12H | 32P |
| 13L | 33G | 13R | 33S | 13J | 33E | 13J | 33Q | 13E | 33Q |
| 14I | 34M | 14C | 34P | 14K | 34J | 14K | 34R | 14K | 34R |
| 15A | 35N | 15I | 35B | 15I | 35B | 15I | 35G | 15Q | 35J |
| 16B | 36L | 16J | 36O | 16R | 36P | 16Q | 36D | 16C | 36C |
| 17R | 37H | 17O | 37T | 17N | 37L | 17F | 37M | 17G | 37G |
| 18P | 38I | 18H | 38A | 18H | 38A | 18C | 38A | 18T | 38M |
| 19Q | 39A | 19N | 39G | 19T | 39S | 19L | 39S | 19L | 39S |
| 20C | 40R | 20K | 40L | 20E | 40T | 20M | 40T | 20M | 40E |
| Brown | Red | Yellow | Green | Blue | Brown | Red | Yellow | Green | Blue |
| 11 | 12 | 13 | 14 | 15 | 16 | 17 | 18 | 19 | 20 |

FIG.6B.

| 21 | 22 | 23 | 24 | 25 | 26 | 27 | 28 | 29 | 30 |
|---|---|---|---|---|---|---|---|---|---|
| 1H | 21F | 1E | 21G | 1D | 21A | 1P | 21L | 1Q | 21D |
| 2R | 22G | 2F | 22H | 2E | 22P | 2K | 22O | 2T | 22N |
| 3A | 23J | 3G | 23R | 3P | 23Q | 3D | 23P | 3L | 23S |
| 4Q | 24D | 4Q | 24L | 4Q | 24L | 4E | 24Q | 4S | 24T |
| 5F | 25M | 5R | 25M | 5R | 25M | 5M | 25E | 5J | 25K |
| 6T | 26I | 6L | 26C | 6M | 26N | 6N | 26F | 6K | 26R |
| 7C | 27L | 7B | 27D | 7N | 27E | 7O | 27S | 7P | 27J |
| 8D | 28B | 8C | 28E | 8I | 28F | 8R | 28N | 8F | 28M |
| 9K | 29R | 9S | 29J | 9S | 29B | 9S | 29C | 9G | 29Q |
| 10L | 30S | 10T | 30K | 10H | 30K | 10G | 30K | 10M | 30C |
| 11P | 31T | 11P | 31S | 11K | 31R | 11H | 31A | 11N | 31B |
| 12J | 32N | 12K | 32N | 12L | 32S | 12I | 32B | 12H | 32P |
| 13G | 33O | 13D | 33O | 13J | 33G | 13B | 33M | 13B | 33E |
| 14M | 34P | 14A | 34A | 14O | 34D | 14C | 34R | 14C | 34F |
| 15S | 35H | 15M | 35B | 15A | 35J | 15A | 35J | 15A | 35O |
| 16E | 36A | 16N | 36T | 16B | 36C | 16J | 36D | 16I | 36L |
| 17I | 37E | 17J | 37P | 17G | 37H | 17F | 37T | 17R | 37A |
| 18B | 38K | 18H | 38Q | 18T | 38I | 18T | 38I | 18O | 38I |
| 19N | 39Q | 19I | 39I | 19F | 39O | 19L | 39G | 19D | 39G |
| 20O | 40C | 20O | 40F | 20C | 40T | 20Q | 40H | 20E | 40H |
| Green | Blue | Brown | Red | Yellow | Green | Blue | Brown | Red | Yellow |
| 1 | 2 | 3 | 4 | 5 | 6 | 7 | 8 | 9 | 10 |

FIG.6C.

| 31 | 32 | 33 | 34 | 35 | 36 | 37 | 38 | 39 | 40 |
|---|---|---|---|---|---|---|---|---|---|
| 1R | 21P | 1O | 21Q | 1N | 21K | 1F | 21B | 1G | 21N |
| 2H | 22Q | 2P | 22R | 2O | 22F | 2A | 22E | 2J | 22D |
| 3K | 23T | 3Q | 23H | 3F | 23G | 3N | 23F | 3B | 23I |
| 4G | 24N | 4G | 24B | 4G | 24B | 4O | 24G | 4I | 24J |
| 5P | 25C | 5H | 25C | 5H | 25C | 5C | 25O | 5T | 25A |
| 6J | 26S | 6B | 26M | 6C | 26D | 6D | 26P | 6A | 26H |
| 7M | 27B | 7L | 27N | 7D | 27O | 7E | 27I | 7F | 27T |
| 8N | 28L | 8M | 28O | 8S | 28P | 8H | 28D | 8P | 28C |
| 9A | 29H | 9I | 29T | 9I | 29L | 9I | 29M | 9Q | 29G |
| 10B | 30I | 10J | 30A | 10R | 20A | 10Q | 30A | 10C | 30M |
| 11F | 31J | 11F | 31I | 11A | 31H | 11R | 31K | 11D | 31L |
| 12T | 32D | 12A | 331D | 12B | 32I | 12S | 32L | 12R | 32F |
| 13Q | 33E | 13N | 33F | 13T | 33Q | 13L | 33C | 13L | 33O |
| 14C | 34F | 14K | 34K | 14E | 34N | 14M | 34H | 14M | 34P |
| 15I | 35R | 15C | 35I | 15K | 35T | 15K | 35T | 15K | 35E |
| 16O | 36K | 16D | 36J | 16I | 36M | 16T | 36N | 16S | 36B |
| 17S | 37O | 17T | 37F | 17Q | 37R | 17P | 37J | 17H | 37K |
| 18L | 38A | 18R | 38G | 18J | 38S | 18J | 38S | 18E | 38S |
| 19D | 39G | 19S | 39S | 19P | 39E | 19B | 39Q | 19N | 39Q |
| 20E | 40M | 20E | 40P | 20M | 40I | 20G | 40R | 20O | 40R |

| Green | Blue | Brown | Red | Yellow | Green | Blue | Brown | Red | Yellow |
|---|---|---|---|---|---|---|---|---|---|
| 11 | 12 | 13 | 14 | 15 | 16 | 17 | 18 | 19 | 20 |

FIG.6D.

| 41 | 42 | 43 | 44 | 45 | 46 | 47 | 48 | 49 | 50 |
|---|---|---|---|---|---|---|---|---|---|
| 1I | 21L | 1J | 21D | 1G | 21E | 1F | 21S | 1R | 21J |
| 2L | 22B | 2T | 22E | 2H | 22F | 2G | 22N | 2M | 22M |
| 3D | 23G | 3C | 23H | 3I | 23P | 3R | 23O | 3F | 23N |
| 4K | 24H | 4S | 24B | 4S | 24J | 4S | 24J | 4G | 24O |
| 5B | 25S | 5H | 25K | 5T | 25K | 5T | 25K | 5O | 25C |
| 6C | 26F | 6B | 26G | 6N | 26A | 6O | 26L | 6P | 26D |
| 7H | 27R | 7E | 27J | 7D | 27B | 7P | 27C | 7Q | 27Q |
| 8R | 28A | 8F | 28T | 8E | 28C | 8K | 28D | 8T | 28L |
| 9S | 29E | 9M | 29P | 9A | 29H | 9A | 29T | 9A | 29A |
| 10E | 30K | 10N | 30Q | 10B | 30I | 10J | 30I | 10I | 30I |
| 11F | 31J | 11R | 31R | 11R | 31Q | 11M | 31P | 11J | 31S |
| 12T | 32D | 12L | 32L | 12M | 32L | 12N | 32Q | 12K | 32T |
| 13N | 33M | 13I | 33M | 13F | 33M | 13L | 33E | 13D | 33K |
| 14O | 34N | 14O | 34N | 14C | 34S | 14Q | 34B | 14E | 34P |
| 15M | 35C | 15A | 35F | 15O | 35T | 15C | 35H | 15C | 35H |
| 16A | 36T | 16G | 36S | 16P | 36R | 16D | 36A | 16L | 36B |
| 17J | 37I | 17K | 37C | 17L | 37N | 17I | 37F | 17H | 37R |
| 18G | 38Q | 18D | 38I | 18J | 38O | 18B | 38G | 18B | 38G |
| 19P | 39O | 19P | 39O | 19K | 39G | 19H | 39M | 19N | 39E |
| 20Q | 40P | 20Q | 40A | 20Q | 40D | 20E | 40R | 20S | 40F |
| Red | Yellow | Green | Blue | Brown | Red | Yellow | Green | Blue | Brown |
| 1 | 2 | 3 | 4 | 5 | 6 | 7 | 8 | 9 | 10 |

FIG.6E.

| 51 | 52 | 53 | 54 | 55 | 56 | 57 | 58 | 59 | 60 |
|----|----|----|----|----|----|----|----|----|----|
| 1S | 21B | 1T | 21N | 1Q | 21O | 1P | 21I | 1H | 21T |
| 2B | 22L | 2J | 22O | 2R | 22F | 2Q | 22D | 2C | 22C |
| 3N | 23Q | 3M | 23R | 3S | 23F | 3H | 23E | 3P | 23D |
| 4A | 24R | 4I | 24L | 4I | 24T | 4I | 24T | 4Q | 24E |
| 5L | 25I | 5R | 25A | 5J | 25A | 5J | 25A | 5E | 25M |
| 6M | 26P | 6L | 26Q | 6D | 26K | 6E | 26B | 6F | 26N |
| 7R | 27H | 7O | 27T | 7N | 27L | 7F | 27M | 7G | 27G |
| 8H | 28K | 8P | 28J | 8O | 28M | 8A | 28N | 8J | 28B |
| 9I | 29O | 9C | 29F | 9K | 29R | 9K | 29J | 9K | 29K |
| 10O | 30A | 10D | 30G | 10L | 30S | 10T | 30S | 10S | 30S |
| 11P | 31T | 11H | 31H | 11H | 31G | 11C | 31F | 11T | 31I |
| 12J | 32N | 12B | 32B | 12C | 32B | 12D | 32G | 12A | 32J |
| 13D | 33C | 13S | 33C | 13P | 33C | 13B | 33O | 13N | 33A |
| 14E | 34D | 14E | 34D | 14M | 34I | 14G | 34O | 14L | 34F |
| 15C | 35M | 15K | 35P | 15E | 35J | 15M | 35R | 15M | 35R |
| 16K | 36J | 16Q | 36I | 16F | 36H | 16N | 36K | 16B | 36L |
| 17T | 37S | 17A | 37M | 17B | 37D | 17S | 37P | 17R | 37H |
| 18Q | 38G | 18N | 38S | 18T | 38E | 18L | 38Q | 18L | 38Q |
| 19F | 39E | 19F | 39E | 19A | 39Q | 19R | 39C | 19D | 39O |
| 20G | 40F | 20G | 40K | 20G | 40N | 20O | 40H | 20I | 40P |

| Red | Yellow | Green | Blue | Brown | Red | Yellow | Green | Blue | Brown |
|-----|--------|-------|------|-------|-----|--------|-------|------|-------|
| 11 | 12 | 13 | 14 | 15 | 16 | 17 | 18 | 19 | 20 |

FIG.6F.

| 61 | 62 | 63 | 64 | 65 | 66 | 67 | 68 | 69 | 70 |
|----|----|----|----|----|----|----|----|----|----|
| 1J | 21R | 1K | 21J | 1L | 21B | 1I | 21C | 1H | 21Q |
| 2E | 22A | 2N | 22T | 2B | 22C | 2J | 22D | 2I | 22L |
| 3R | 23B | 3F | 23E | 3E | 23F | 3K | 23N | 3T | 23M |
| 4S | 24C | 4M | 24F | 4A | 24T | 4A | 24H | 4A | 24H |
| 5G | 25K | 5D | 25Q | 5J | 25I | 5B | 25I | 5B | 25I |
| 6H | 26L | 6E | 26D | 6D | 26E | 6P | 26S | 6Q | 26J |
| 7I | 27E | 7J | 27P | 7G | 27H | 7F | 27T | 7R | 27A |
| 8L | 28T | 8T | 28S | 8H | 28R | 8G | 28A | 8M | 28B |
| 9M | 29I | 9A | 29C | 9O | 29N | 9C | 29F | 9C | 29R |
| 10A | 30Q | 10G | 30I | 10P | 30O | 10D | 30G | 10L | 30G |
| 11B | 31G | 11H | 31H | 11T | 31P | 11T | 31O | 11O | 31N |
| 12C | 32H | 12B | 32B | 12N | 32J | 12O | 32J | 12P | 32O |
| 13P | 33S | 13P | 33K | 13K | 33K | 13H | 33K | 13N | 33C |
| 14Q | 34D | 14Q | 34I | 14Q | 34I | 14E | 34Q | 14S | 34T |
| 15O | 35P | 15O | 35A | 15C | 35D | 15Q | 35R | 15E | 35F |
| 16D | 36J | 16C | 36R | 16I | 36Q | 16R | 36P | 16F | 36S |
| 17T | 37F | 17L | 37G | 17M | 37A | 17N | 37L | 17K | 37D |
| 18N | 38O | 18I | 38O | 18F | 38G | 18L | 38M | 18D | 38E |
| 19F | 39M | 19R | 39M | 19R | 39M | 19M | 39E | 19J | 39K |
| 20K | 40N | 20S | 40N | 20S | 40S | 20S | 40B | 20J | 40P |
| Blue | Brown | Red | Yellow | Green | Blue | Brown | Red | Yellow | Green |
| 1 | 2 | 3 | 4 | 5 | 6 | 7 | 8 | 9 | 10 |

FIG.6G.

| 71 | 72 | 73 | 74 | 75 | 76 | 77 | 78 | 79 | 80 |
|---|---|---|---|---|---|---|---|---|---|
| 1T | 21H | 1A | 21T | 1B | 21L | 1S | 21M | 1R | 21Q |
| 2O | 22K | 2D | 22J | 2L | 22M | 2T | 22N | 2S | 22B |
| 3H | 23L | 3P | 23O | 3O | 23P | 3A | 23D | 3J | 23C |
| 4I | 24M | 4C | 24P | 4K | 24J | 4K | 24R | 4K | 24R |
| 5Q | 25A | 5N | 25G | 5T | 25S | 5L | 25S | 5L | 25S |
| 6R | 26B | 6O | 26N | 6N | 26O | 6F | 26I | 6G | 26T |
| 7S | 27O | 7T | 27F | 7Q | 27R | 7P | 27J | 7H | 27K |
| 8B | 28J | 8J | 28I | 8R | 28H | 8Q | 28K | 8C | 28L |
| 9C | 29S | 9K | 29M | 9E | 29D | 9M | 29P | 9M | 29H |
| 10K | 30G | 10Q | 30S | 10F | 30E | 10N | 30Q | 10B | 30Q |
| 11L | 31Q | 11R | 31R | 11J | 31F | 11J | 31E | 11E | 31D |
| 12M | 32R | 12L | 32L | 12D | 32T | 12E | 32T | 12F | 32E |
| 13F | 33I | 13F | 33A | 13A | 33A | 13R | 33A | 13D | 33M |
| 14G | 34N | 14G | 34B | 14G | 34B | 14O | 34G | 14I | 34J |
| 15E | 35F | 15E | 35K | 15M | 35N | 15G | 35H | 15O | 35P |
| 16N | 36T | 16M | 36H | 16S | 36G | 16H | 36F | 16P | 36I |
| 17J | 37P | 17B | 37Q | 17C | 37K | 17D | 37B | 17A | 37N |
| 18D | 38E | 18S | 38E | 18P | 38Q | 18B | 38C | 18N | 38O |
| 19P | 39C | 19H | 39C | 19H | 39C | 19C | 39O | 19T | 39A |
| 20A | 40D | 20I | 40D | 20I | 40I | 20I | 40L | 20Q | 40F |
| Blue | Brown | Red | Yellow | Green | Blue | Brown | Red | Yellow | Green |
| 11 | 12 | 13 | 14 | 15 | 16 | 17 | 18 | 19 | 20 |

FIG.6H.

| 81 | 82 | 83 | 84 | 85 | 86 | 87 | 88 | 89 | 90 |
|---|---|---|---|---|---|---|---|---|---|
| 1T | 21E | 1L | 21P | 1M | 21H | 1N | 21T | 1K | 21A |
| 2A | 22T | 2G | 22S | 2P | 22R | 2D | 22A | 2L | 22B |
| 3L | 23A | 3T | 23T | 3H | 23C | 3G | 23D | 3M | 23I |
| 4M | 24P | 4A | 24A | 4O | 24D | 4C | 24R | 4C | 24F |
| 5N | 25Q | 5I | 25I | 5F | 25O | 5L | 25G | 5D | 25G |
| 6I | 26R | 6J | 26J | 6G | 26B | 6F | 26C | 6R | 26Q |
| 7J | 27I | 7K | 27C | 7L | 27N | 7I | 27F | 7H | 27R |
| 8E | 28J | 8N | 28R | 8B | 28Q | 8J | 28P | 8I | 28S |
| 9O | 29F | 9O | 29G | 9C | 29A | 9Q | 29L | 9E | 29D |
| 10D | 30O | 10C | 30O | 10I | 30G | 10R | 30M | 10F | 30E |
| 11D | 31B | 11G | 31E | 11J | 31F | 11B | 31N | 11B | 31M |
| 12H | 32C | 12E | 32F | 12D | 32T | 12P | 32H | 12Q | 32H |
| 13F | 33K | 13R | 33Q | 13R | 33I | 13M | 33I | 13J | 33I |
| 14K | 34H | 14S | 34B | 14S | 34J | 14S | 34J | 14B | 34O |
| 15Q | 35N | 15Q | 35N | 15Q | 35S | 15E | 35B | 15S | 35P |
| 16R | 36G | 16F | 36H | 16E | 36P | 16K | 36O | 16T | 36N |
| 17C | 37L | 17B | 37D | 17N | 37E | 17O | 37S | 17P | 37J |
| 18P | 38M | 18P | 38M | 18K | 38M | 18H | 38E | 18N | 38K |
| 19P | 39C | 19H | 39C | 19H | 39C | 19C | 39O | 19T | 39A |
| 20S | 40D | 20M | 40L | 20A | 40L | 20A | 40Q | 20A | 40T |
| Yellow | Green | Blue | Brown | Red | Yellow | Green | Blue | Brown | Red |
| 1 | 2 | 3 | 4 | 5 | 6 | 7 | 8 | 9 | 10 |

FIG. 61.

| 91 | 92 | 93 | 94 | 95 | 96 | 97 | 98 | 99 | 100 |
|---|---|---|---|---|---|---|---|---|---|
| 1J | 21O | 1B | 21F | 1C | 21R | 1D | 21J | 1A | 21K |
| 2K | 22J | 2Q | 22I | 2F | 22H | 2N | 22Q | 2B | 22L |
| 3B | 23K | 3J | 23J | 3R | 23M | 3Q | 23N | 3C | 23B |
| 4C | 24F | 4K | 24K | 4E | 24N | 4M | 24H | 4M | 24P |
| 5D | 25G | 5S | 25S | 5P | 25E | 5B | 25Q | 5N | 25Q |
| 6S | 26H | 6T | 26T | 6Q | 26L | 6P | 26M | 6H | 26G |
| 7T | 27S | 7A | 27M | 7B | 27D | 7S | 27P | 7R | 27H |
| 8O | 28T | 8D | 28H | 8L | 28G | 8T | 28F | 8S | 28I |
| 9E | 29P | 9E | 29Q | 9M | 29K | 9G | 29B | 9O | 29N |
| 10N | 30E | 10M | 30E | 10S | 30Q | 10H | 30C | 10P | 30O |
| 11Q | 31L | 11N | 31O | 11T | 31P | 11L | 31D | 11L | 31C |
| 12R | 32M | 12O | 32P | 12N | 32J | 12F | 32R | 12G | 32R |
| 13P | 33A | 13H | 33G | 13H | 33S | 13C | 33S | 13T | 33S |
| 14A | 34R | 14I | 34L | 14I | 34T | 14I | 34T | 14Q | 34E |
| 15G | 35D | 15G | 35D | 15G | 35I | 15O | 35L | 15I | 35F |
| 16H | 36Q | 16P | 36R | 16O | 36F | 16A | 36E | 16J | 36D |
| 17M | 37B | 17L | 37N | 17D | 37O | 17E | 37I | 17F | 37T |
| 18F | 38C | 18F | 38C | 18A | 38C | 18R | 38O | 18D | 38A |
| 19L | 39I | 19R | 39A | 19J | 39A | 19J | 39A | 19E | 39M |
| 20I | 40N | 20C | 40B | 20K | 40B | 20K | 40G | 20K | 40I |
| Yellow | Green | Blue | Brown | Red | Yellow | Green | Blue | Brown | Red |
| 11 | 12 | 13 | 14 | 15 | 16 | 17 | 18 | 19 | 20 |

FIG.6J.

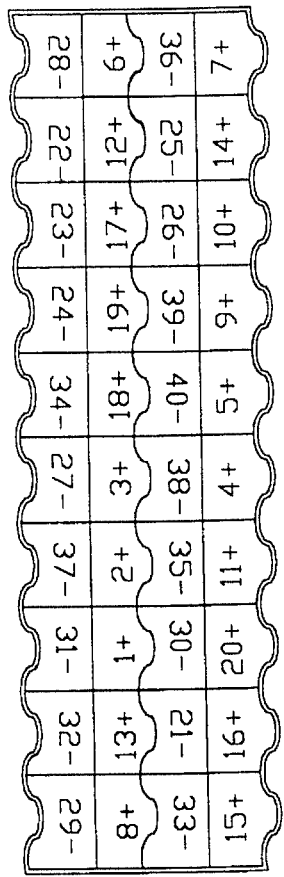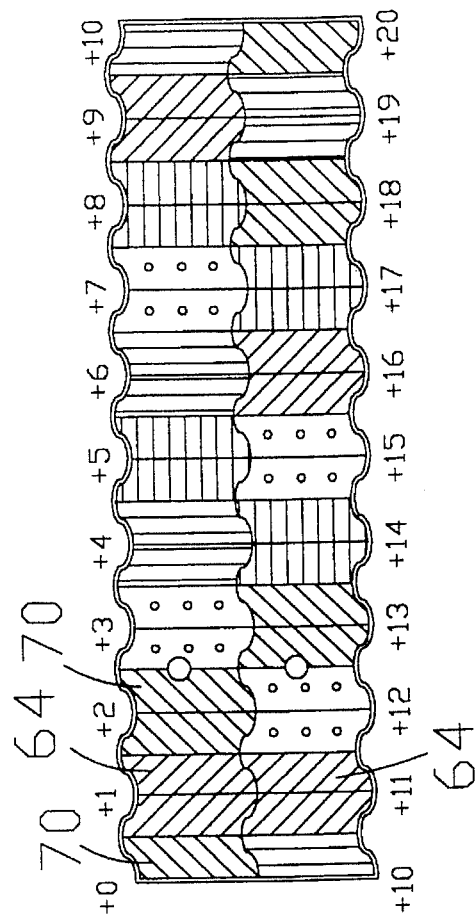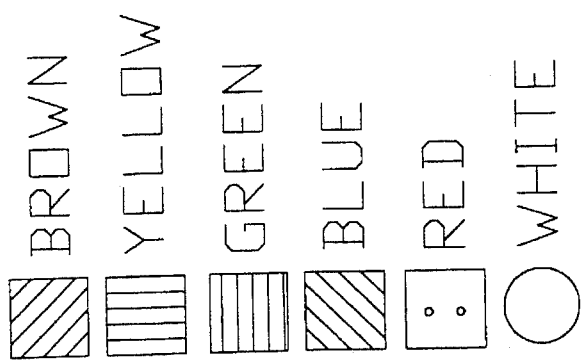

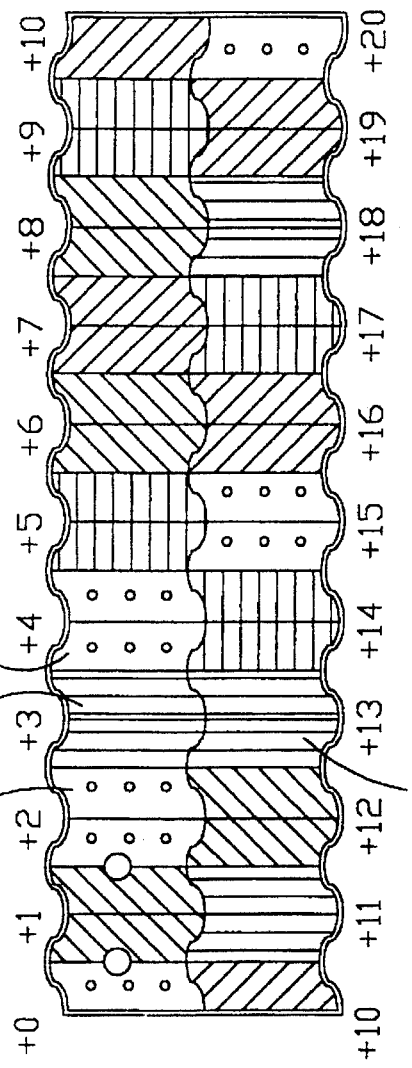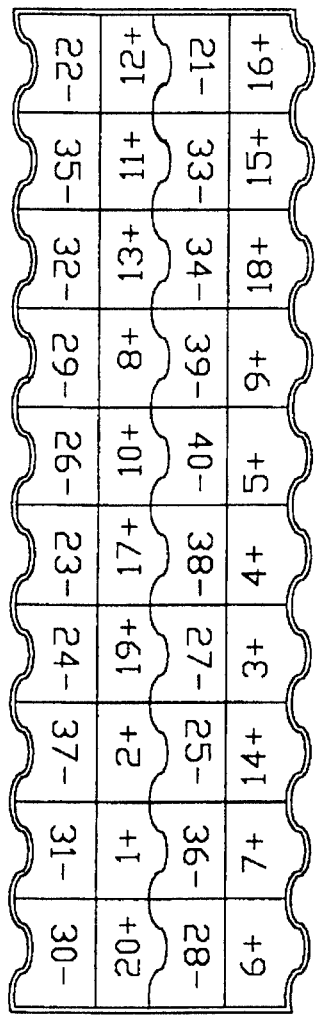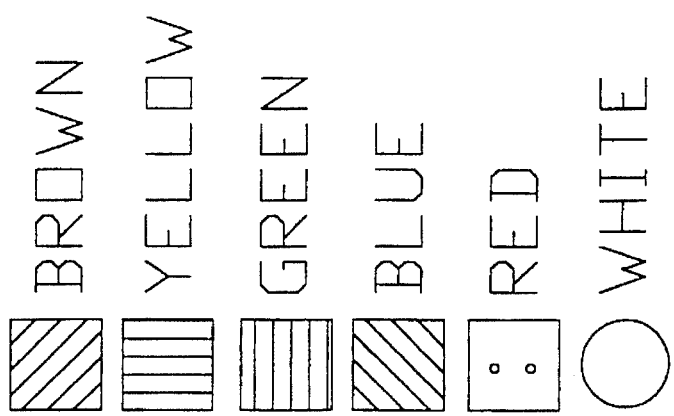

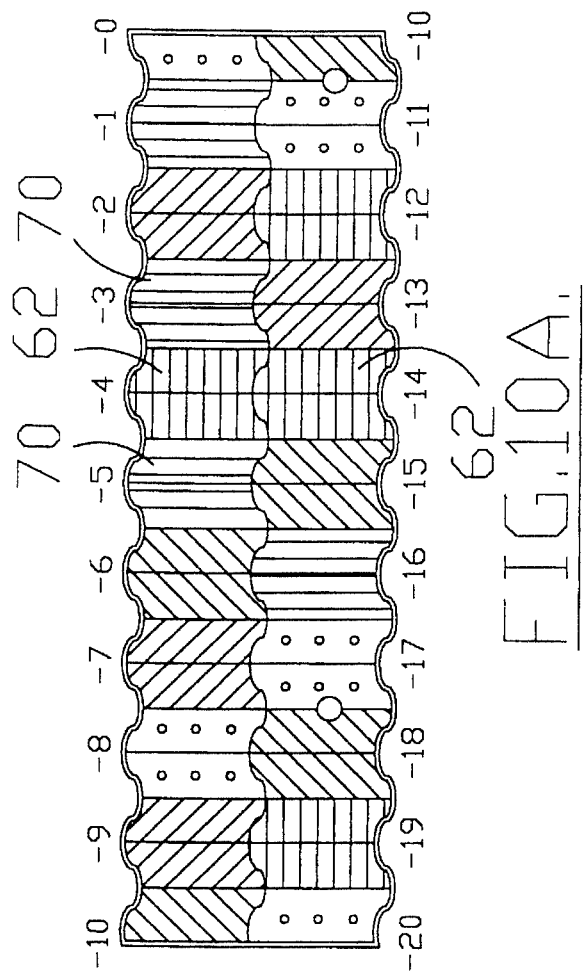
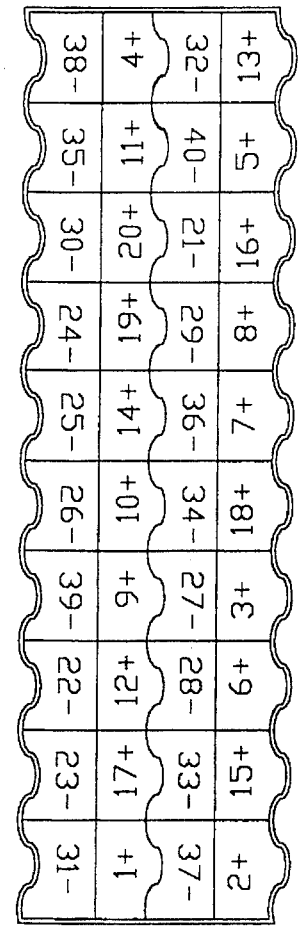
FIG.10A.
FIG.10B.
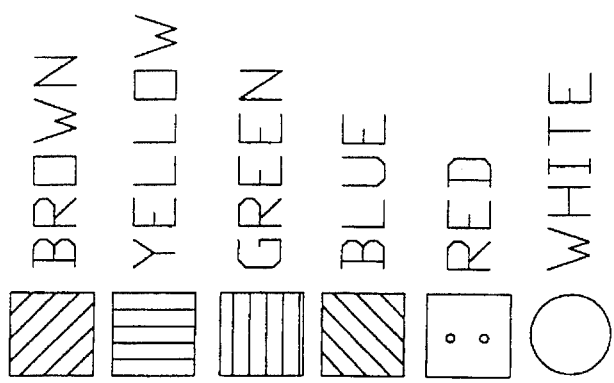

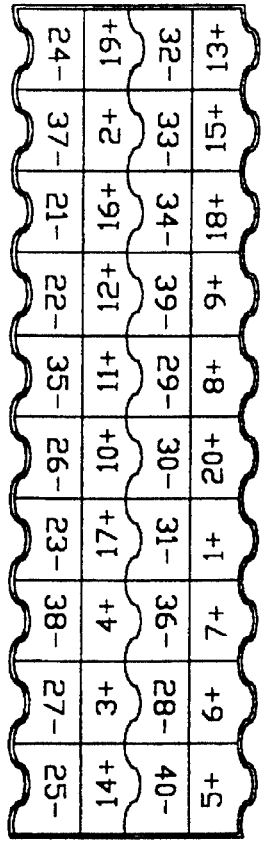
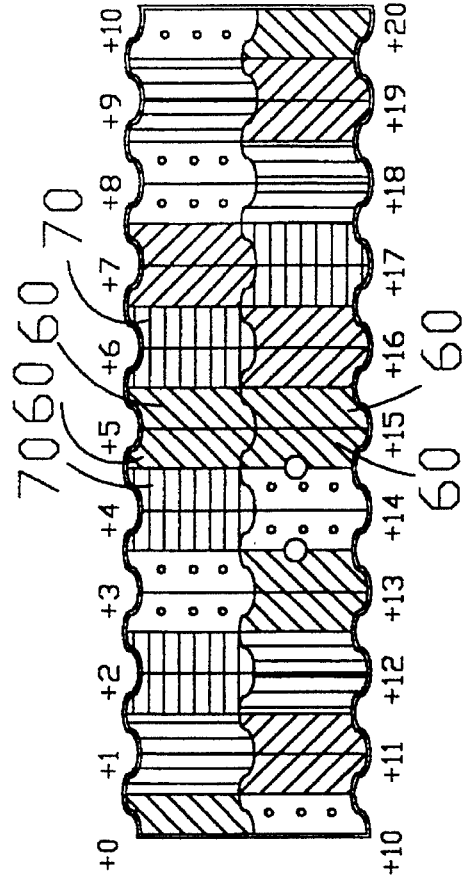
FIG.11B.  FIG.11A.
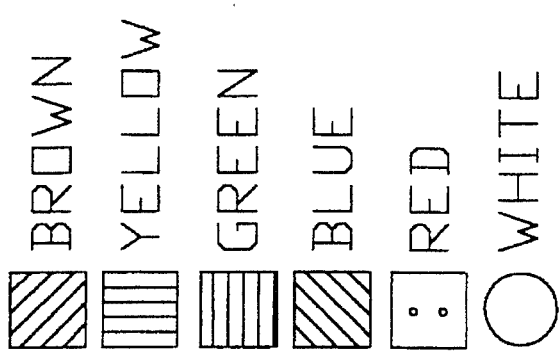

BROWN
YELLOW
GREEN
BLUE
RED

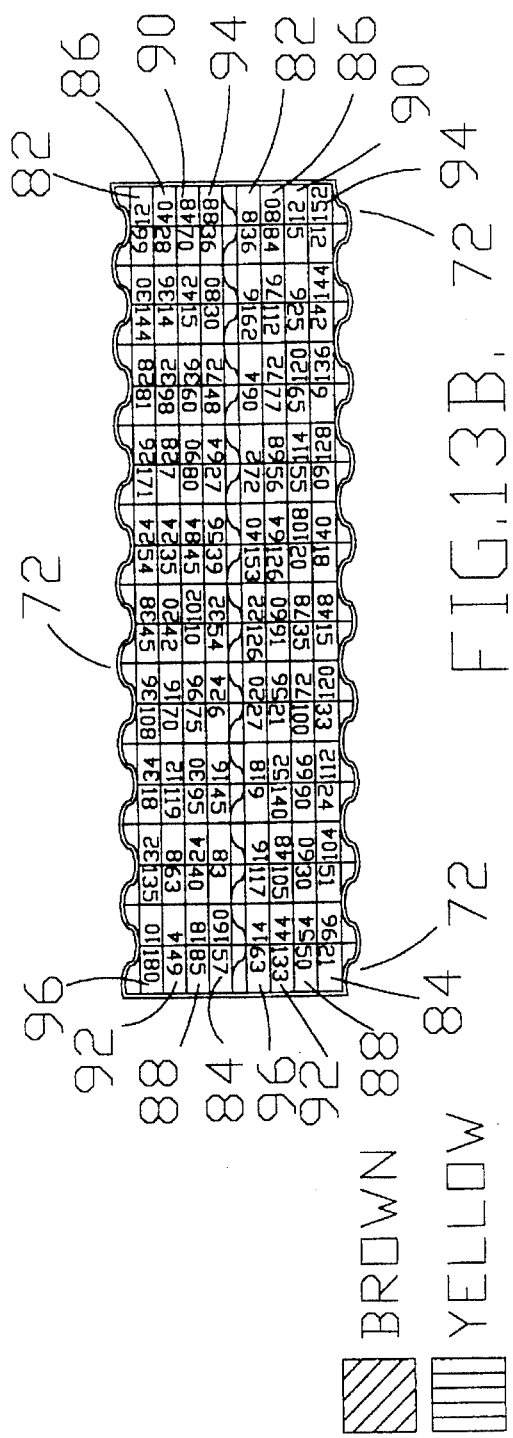
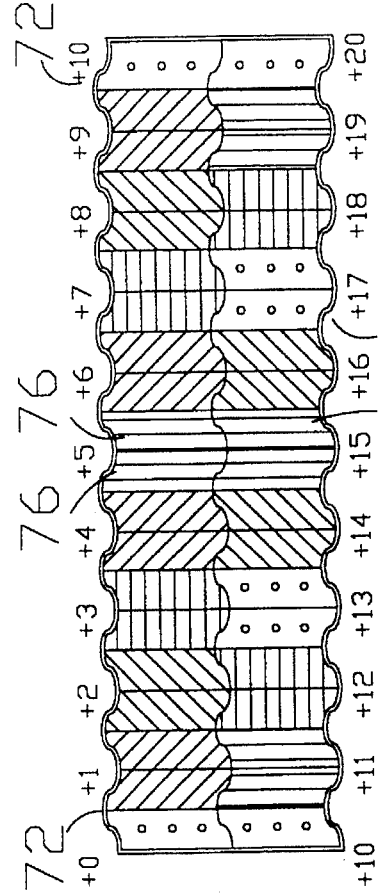
FIG.13B.
FIG.13A.
BROWN
YELLOW
GREEN
BLUE
RED

SUBTRACTION

| U 46/21 | V 47/22 | W 48/23 | X 49/24 | Y 50/25 |
| --- | --- | --- | --- | --- |
| P 41/16 | Q 42/17 | R 43/18 | S 44/19 | T 45/20 |
| K 36/11 | L 37/12 | M 38/13 | N 39/14 | O 40/15 |
| F 31/6 | G 32/7 | H 33/8 | I 34/9 | J 35/10 |
| A 26/1 | B 27/2 | C 28/3 | D 29/4 | E 30/5 |

| A 1/26 | B 2/27 | C 3/28 | D 4/29 | E 5/30 |
| --- | --- | --- | --- | --- |
| F 6/31 | G 7/32 | H 8/33 | I 9/34 | J 10/35 |
| K 11/36 | L 12/37 | M 13/38 | N 14/39 | O 15/40 |
| P 16/41 | Q 17/42 | R 18/43 | S 19/44 | T 20/45 |
| U 21/46 | V 22/47 | W 23/48 | X 24/49 | Y 25/50 |

ADDITION

FIG. 14.

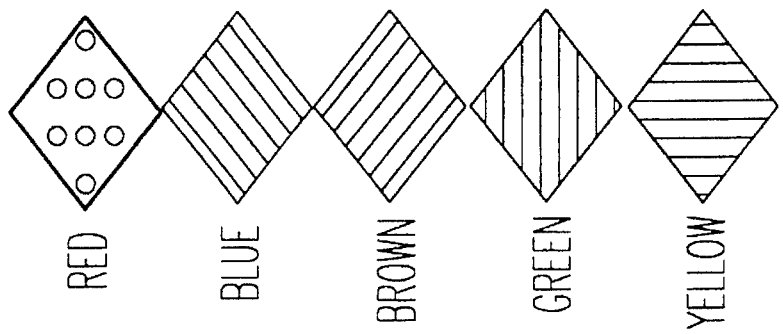
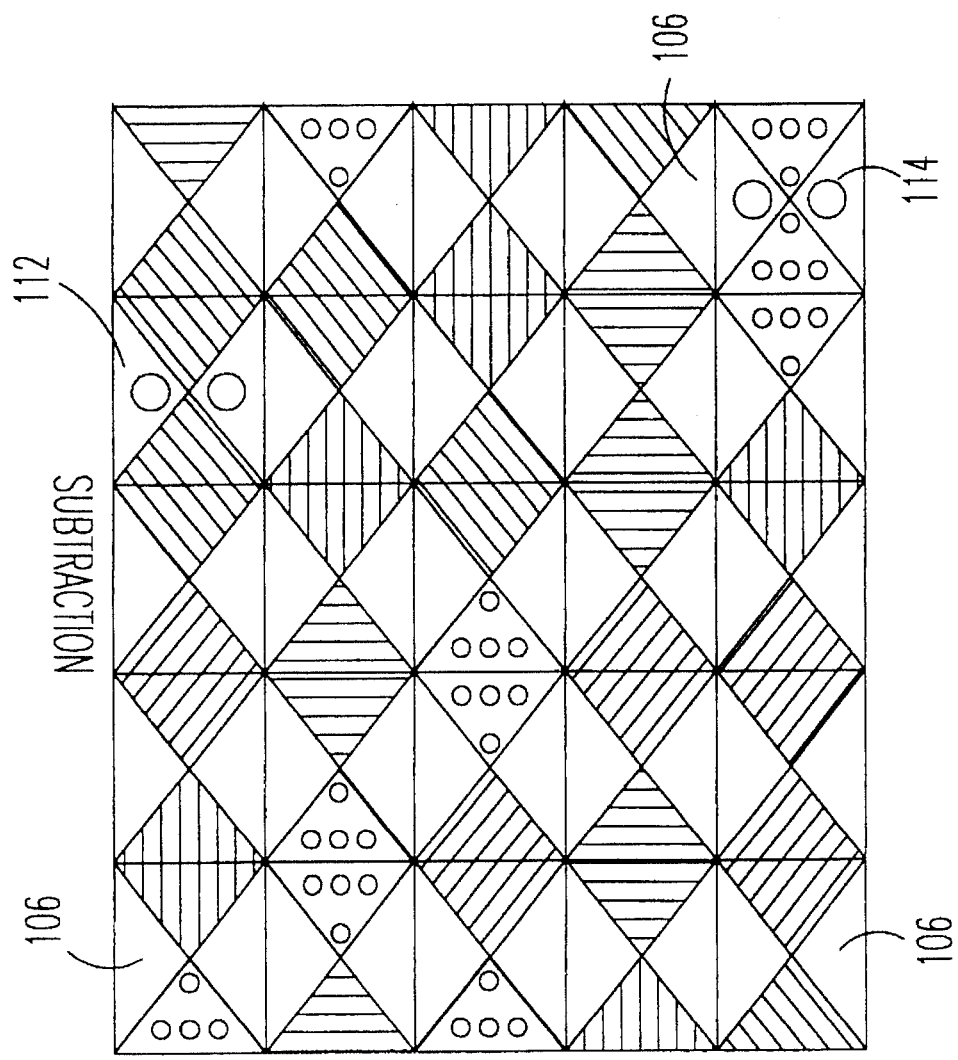
FIG. 16A

| +6 | +22 | +19 | +25 | +20 |
|----|-----|-----|-----|-----|
| −50 | −64 | −48 | −47 | −49 |
| +15 | +5 | +24 | +42 | +4 |
| −45 | −44 | −21 | −41 | −36 |
| +12 | +8 | +17 | +1 | +10 |
| −40 | −39 | −38 | −37 | −31 |
| +2 | +7 | +14 | +9 | +3 |
| −35 | −34 | −33 | −32 | −26 |
| +18 | +13 | +23 | +11 | +16 |
| −30 | −29 | −28 | −27 | −26 |

SUBTRACTION

FIG. 16B.

| +16 / −25 | +11 / −24 | +23 / −23 | +13 / −22 | +18 / −21 |
|---|---|---|---|---|
| +3 / −20 | +9 / −19 | +14 / −18 | +7 / −17 | +2 / −16 |
| +10 / −15 | +1 / −14 | +17 / −13 | +8 / −12 | +12 / −11 |
| +4 / −10 | +24 / −9 | +21 / −8 | +5 / −7 | +15 / −6 |
| +20 / −5 | +25 / −4 | +19 / −3 | +22 / −2 | +6 / −1 |

SUBTRACTION

FIG. 16C.

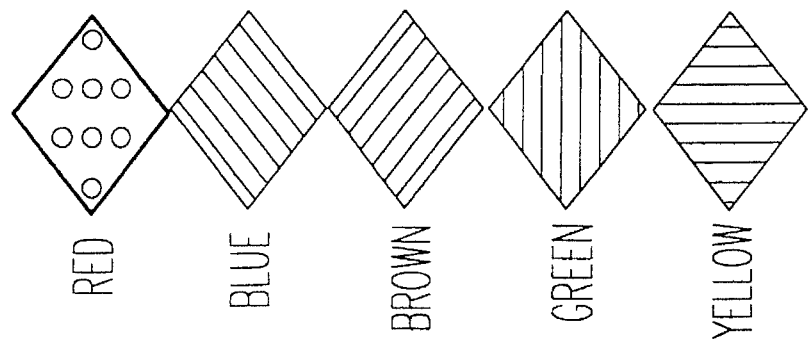
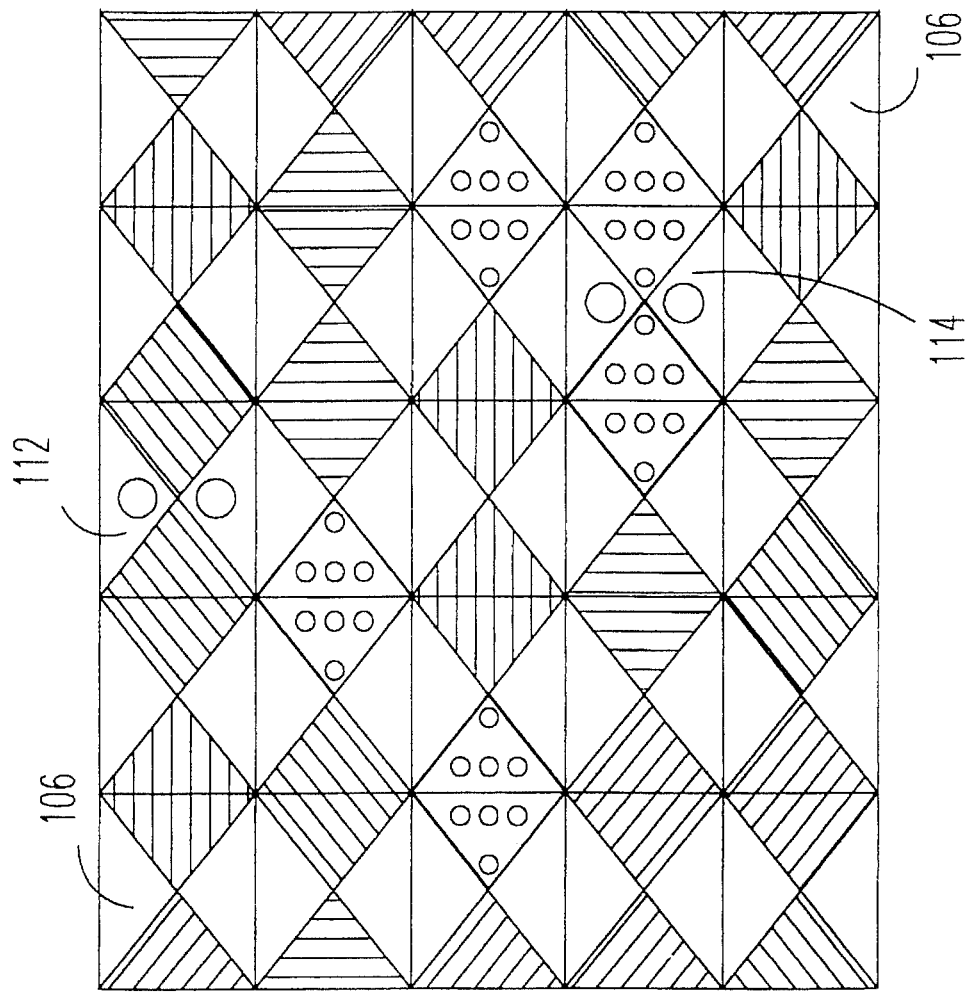
FIG. 17A.

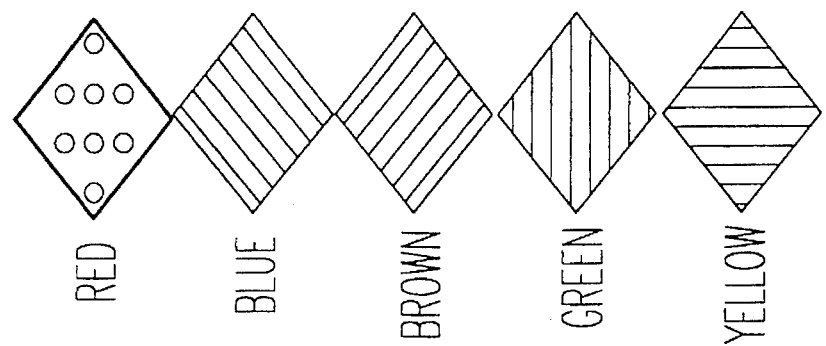
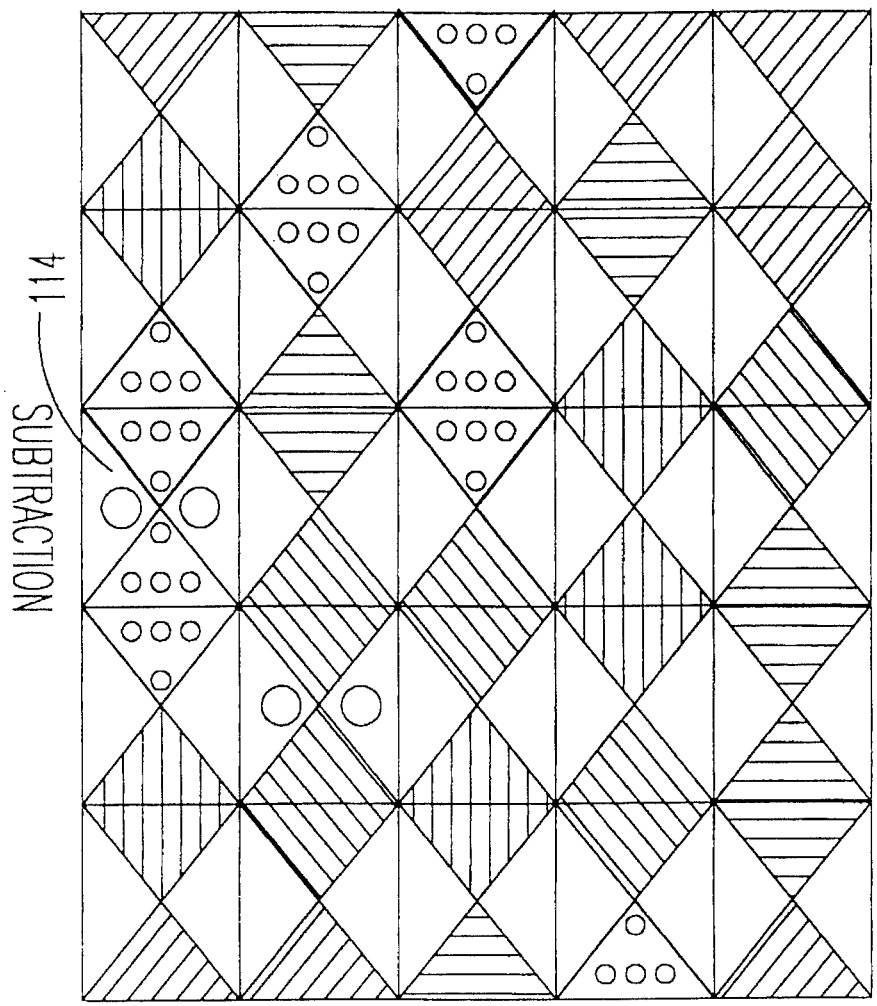
FIG. 18A.

FIG. 18B

SUBTRACTION

| +3<br>29- | +18<br>30- | +3<br>31- | +6<br>32- | +14<br>33- |
|---|---|---|---|---|
| +7<br>34- | +2<br>35- | +10<br>36- | +1<br>37- | +17<br>38- |
| +8<br>39- | +12<br>40- | +4<br>41- | +24<br>42- | +21<br>43- |
| +5<br>44- | +15<br>45- | +20<br>46- | +25<br>47- | +16<br>48- |
| +22<br>49- | +9<br>50- | +16<br>-26 | +11<br>27- | +23<br>28- |

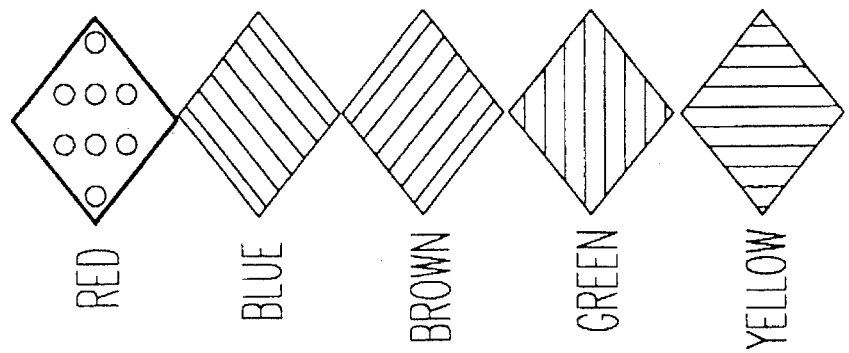
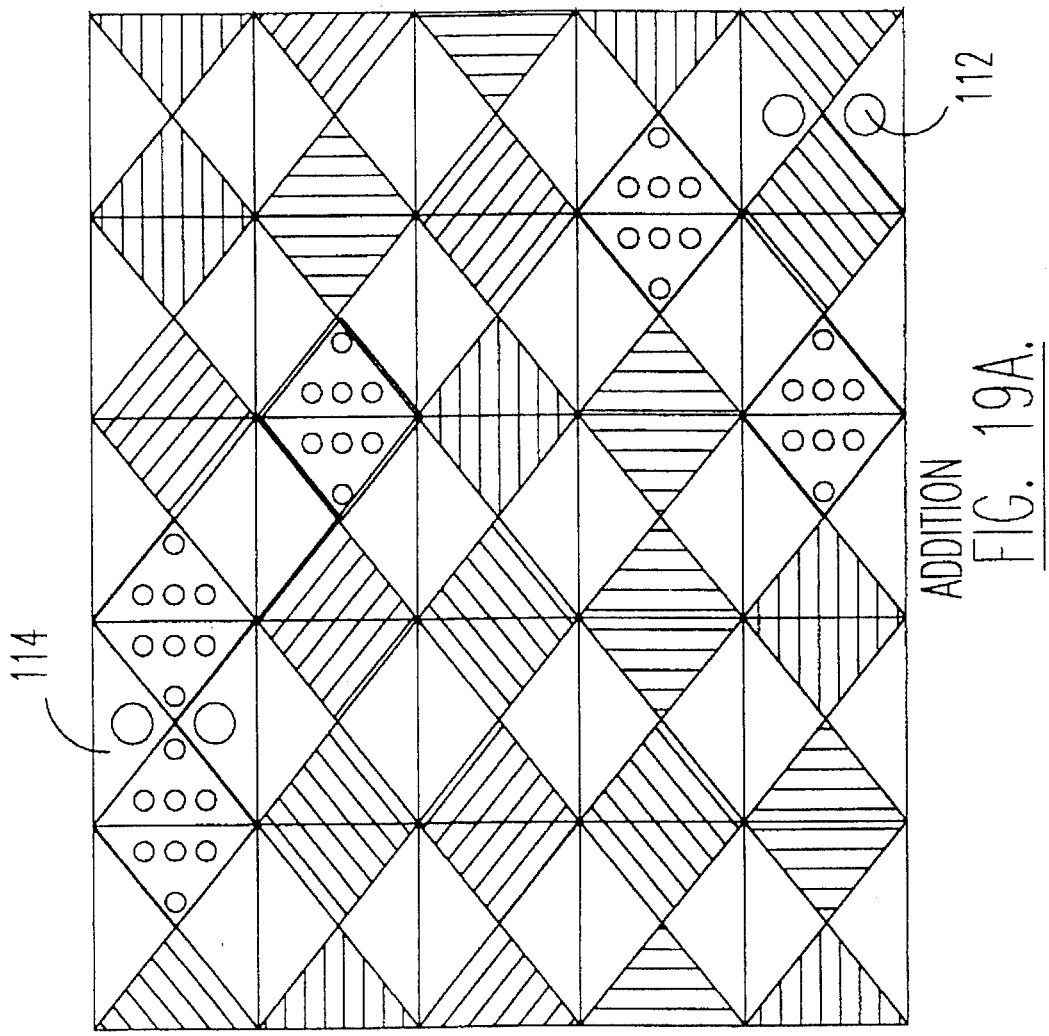
FIG. 19A.
ADDITION

| | | | | |
|---|---|---|---|---|
| 41− | 26− | 40− | 28− | 36− |
| +4 | +16 | +21 | +23 | +10 |
| 42− | 30− | 39− | 44− | 34− |
| +24 | +18 | +8 | +5 | +7 |
| 29− | 48− | 37− | 49− | 33− |
| +13 | +19 | +1 | +22 | +14 |
| 31− | 46− | 32− | 45− | 50− |
| +3 | +20 | +9 | +15 | +6 |
| 35− | 43− | 27− | 38− | 47− |
| +2 | +12 | +11 | +17 | +25 |

FIG. 19B.

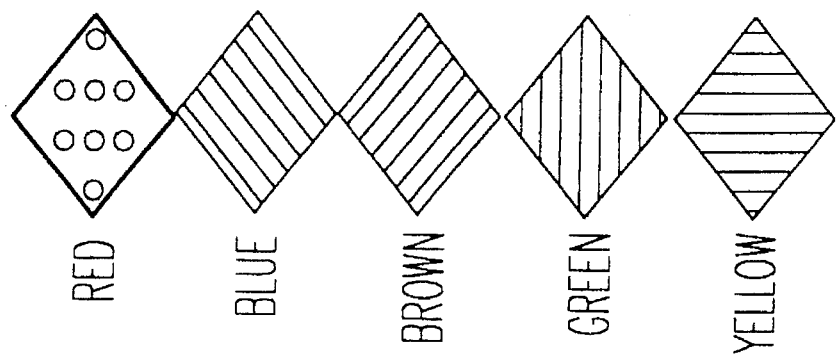
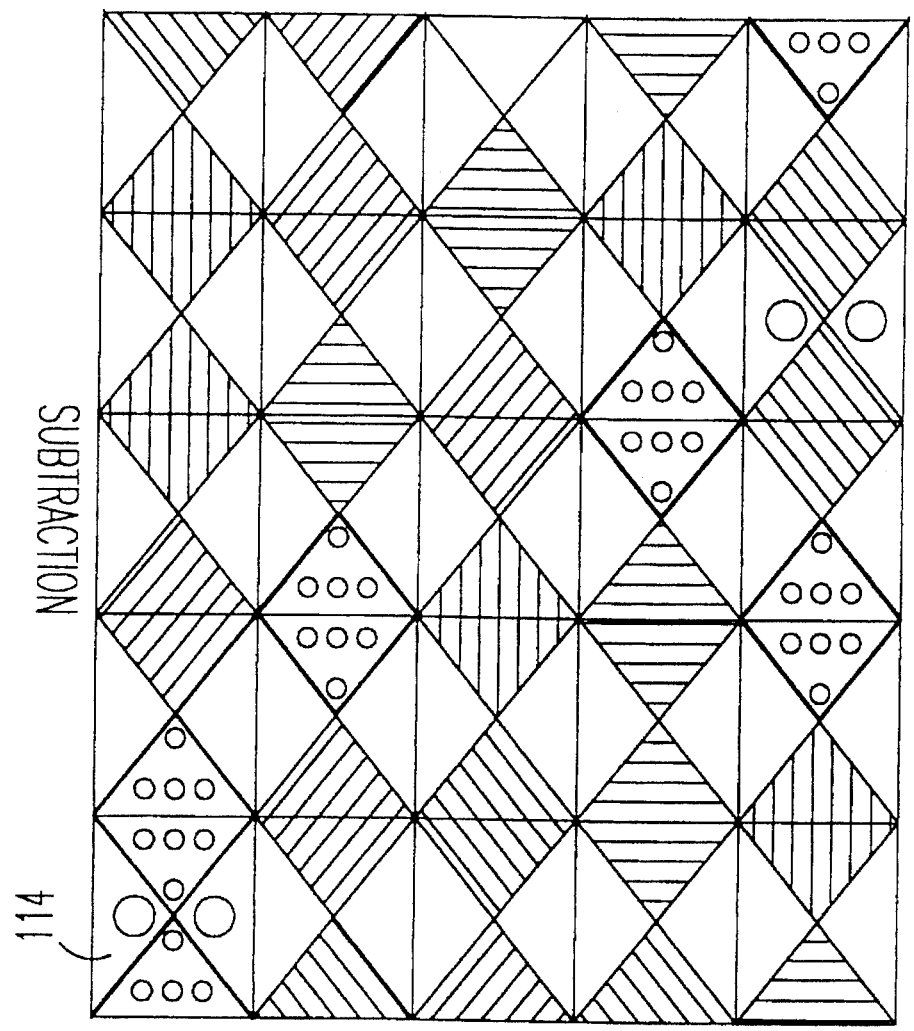
FIG. 19C.

FIG. 16D

| +4 / 41− | +25 / 47− | +17 / 38− | +11 / 27− | +21 / 43− |
|---|---|---|---|---|
| +2 / 35− | +6 / 50− | +15 / 45− | +9 / 32− | +20 / 46− |
| +3 / 31− | +14 / 33− | +22 / 49− | +1 / 37− | +19 / 48− |
| +13 / 29− | +7 / 34− | +5 / 44− | +8 / 39− | +18 / 30− |
| +24 / 42− | +10 / 36− | +23 / 28− | +12 / 40− | +16 / 26− |

112

114

LEARNING BOARD IN COMBINATION WITH SOLUTION LISTS

BACKGROUND OF THE INVENTION

The present invention relates in general to educational aids and pertains, more particularly, to a learning board for teaching a combination of mathematical and non-mathematical subjects. The mathematical subjects preferably include addition, subtraction, and division, whereas the non-mathematical subjects can include any subject that can be taught through multiple choice questions.

With conventional learning boards, only one receiving area is provided in which to place the movable pieces after correctly performing a learning exercise. This drawback generally limits the number of mathematical lessons that can be taught. Additionally, conventional learning boards do not possess features necessary to combine the teaching of mathematics with other non-mathematical subjects on a common learning board while also providing means for answer verification including continuously visible feedback during either mathematical or non-mathematical exercises. Furthermore, with conventional one-receiving area learning boards, the board pieces must be mixed-up after a lesson is completed before they can be used for the next lesson. This ensures that the board pieces are not prearranged or in a particular order which may simplify the solution of subsequent exercises.

Accordingly, it is an object of the present invention to provide an improved learning board having multiple receiving area on the same playing surface that allows the teaching of a greater multitude of mathematical exercises on a common learning board.

Another object of the present invention is to provide an improved learning board that provides the ability to teach both mathematical exercises and non-mathematical subjects, while providing verification means for both teacher and pupil that is continuously visible during both the mathematical and non-mathematical exercises.

A further object of the present invention is to provide an improved learning board in which a substantially correct solution of an exercise utilizing one receiving area disorganizes or mixes up the board pieces with respect to a substantially correct solution of another exercise utilizing another receiving area. After a first lesson is completed, the board pieces do not have to be mixed-up or shaken prior to performing a subsequent lesson.

SUMMARY OF THE INVENTION

To accomplish the foregoing and other objects of this invention there is provided a learning board capable of teaching both mathematical and non-mathematical subjects. The learning board comprises a playing surface having multiple receiving areas within the same horizontal plane, a plurality of board pieces, and a plurality of solution lists. The playing surface, the board pieces, and the solution lists all having a plurality of indicia, determined such that when the board pieces are correctly placed in the appropriate receiving area for an exercise, the indicia allows for an almost instantaneous verification of the accuracy of the solution while automatically mixing the board pieces with respect to an alternative receiving area used for the next exercise.

The learning board is adapted for use with both mathematical and non-mathematical exercises and is thus used in combination with pre-mixed multiple choice alphabetical solution sheets that can be utilized for teaching any subject in which questions can be developed that utilize multiple choice answers. Preferably, the mathematical subjects capable of being taught with the learning board include addition, subtraction, and division.

The playing surface has a plurality of indicia include a plurality of answer/orientation indicia, a plurality of constant/confirmation indicia, and a plurality of constant/orientation indicia. In a preferred embodiment, the plurality of answer/orientation indicia include both numerical answers and alphabetical answers that include a plurality of board positions, the plurality of constant/confirmation indicia including a plurality of first numeric indicia that include addition and subtraction constants, and a plurality of first non-numeric indicia that include a plurality of color codes, a plurality of constant/orientation indicia including a plurality of second numeric indicia that include a plurality of different orientated division constants, and at least one second non-numeric indicia that includes an orientated representation.

The board pieces have a plurality of indicia include a plurality of verification indicia, and a plurality of question/orientation indicia. In a preferred embodiment, the plurality of verification indicia include a plurality of color patterns and at least one marker, a plurality of question/orientation indicia including addition and subtraction questions or different orientated division questions.

The solution lists have a plurality of answer numbers, a plurality of alphabetical solutions, and a plurality of indicator indicia. In a preferred embodiment, the plurality of indicator indicia include a color indicator and a numerical indicator.

In a preferred embodiment, the receiving areas are recessed into the playing surface, like a tray or well, where they receive board pieces. In an alternative preferred embodiment, both the trays and the board pieces received within them have wavy or scalloped edges in jigsaw puzzle-like fashion allowing for substantial congruency between the receiving tray and the board pieces when the exercises are correctly solved.

In another alternative preferred embodiment, the receiving areas are not recessed.

In one preferred embodiment, the learning board includes a playing surface having twenty board positions. In another preferred embodiment, the learning board includes a playing surface having twenty-five board positions.

BRIEF DESCRIPTION OF THE DRAWINGS

Numerous other objects, features and advantages of the present invention should now become apparent upon a reading of the following detailed description taken in conjunction with the accompanying drawings, in which:

FIG. 2A is a plan view of a preferred embodiment of the top of the learning pieces primarily used for addition, subtraction, or multiple-choice exercises showing both markers and color-patterns of the verification indicia when correctly placed in the appropriate receiving area during an addition exercise;

FIG. 2B is a plan view of a preferred embodiment of the bottom of the learning pieces primarily used for addition, subtraction, or multiple-choice exercises showing the addition questions and the subtraction questions of the question/orientation indicia;

FIG. 3A is a plan view of a preferred embodiment of the top of the learning pieces primarily used for addition, subtraction, or multiple-choice exercises showing both markers and color-patterns of the verification indicia when correctly placed in the appropriate receiving area during a subtraction exercise;

FIG. 3B is a plan view of a preferred embodiment of the bottom of the learning pieces primarily used for addition, subtraction or multiple-choice exercises showing the addition questions and the subtraction questions of the question/orientation indicia;

FIG. 4A is an alternative plan view of a preferred embodiment of the top of the learning pieces primarily used for addition, subtraction, or multiple-choice exercises showing both markers and color-patterns of the verification indicia when correctly placed in the appropriate receiving area during an addition exercise;

FIG. 4B is an alternative plan view of a preferred embodiment of the bottom of the learning pieces primarily used for addition, subtraction, or multiple choice exercises showing the addition questions and the subtraction questions of the question/orientation indicia;

FIG. 5A is an alternative plan view of a preferred embodiment of the top of the learning pieces primarily used for addition, subtraction, or multiple-choice exercises showing both markers and color-patterns of the verification indicia when correctly placed in the appropriate receiving area during a subtraction exercise;

FIG. 5B is an alternative plan view of a preferred embodiment of the bottom of the learning pieces primarily used for addition, subtraction, or multiple-choice exercises showing the addition questions and the subtraction questions of the question/orientation indicia;

FIGS. 6A–6J show alternative pre-mixed multiple choice alphabetical solution lists;

FIG. 7A is a plan view of a preferred embodiment of the top of the learning pieces primarily used for addition, subtraction, or multiple-choice exercises showing both markers and color-patterns of the verification indicia when correctly placed in the appropriate receiving area during a multiple choice exercise;

FIG. 7B is a plan view of a preferred embodiment of the bottom of the learning pieces primarily used for addition, subtraction, or multiple-choice exercises showing the addition questions and the subtraction questions of the question/orientation indicia;

FIG. 9A is an alternative plan view of a preferred embodiment of the top of the learning pieces primarily used for addition, subtraction, or multiple-choice exercises showing both markers and color-patterns of the verification indicia when correctly placed in the appropriate receiving area during a multiple choice exercise;

FIG. 9B is an alternative plan view of a preferred embodiment of the bottom of the learning pieces primarily used for addition, subtraction, or multiple-choice exercises showing the addition questions and the subtraction questions of the question/orientation indicia;

FIG. 10A is an alternative plan view of a preferred embodiment of the top of the learning pieces primarily used for addition, subtraction, or multiple-choice exercises showing both markers and color-patterns of the verification indicia when correctly placed in the appropriate receiving area during a multiple choice exercise;

FIG. 10B is an alternative plan view of a preferred embodiment of the bottom of the learning pieces primarily used for addition, subtraction, or multiple-choice exercises showing the addition questions and the subtraction questions of the question/orientation indicia;

FIG. 11A is an alternative plan view of a preferred embodiment of the top of the learning pieces primarily used for addition, subtraction, or multiple-choice exercises showing both markers and color-patterns of the verification indicia when correctly placed in the appropriate receiving area during a multiple choice exercise;

FIG. 11B is an alternative plan view of a preferred embodiment of the bottom of the learning pieces primarily used for addition, subtraction, or multiple-choice exercises showing the addition questions and the subtraction questions of the question/orientation indicia;

FIG. 13A is an alternative plan view of a preferred embodiment of the top of the learning pieces primarily used for division exercises showing the color-patterns of the verification indicia when correctly placed in the appropriate receiving area during a division exercise;

FIG. 13B is an alternative plan view of a preferred embodiment of the bottom of the learning pieces primarily used for division exercises showing the plurality of different orientated division questions of the question/orientation indicia;

FIG. 14 is a plan view of an alternative preferred embodiment of a learning board having receiving areas, each receiving area with a plurality of answer/orientation indicia that include twenty-five board positions;

FIG. 16A is a plan view of a preferred embodiment of the top of the learning pieces primarily used for addition, subtraction, and multiple-choice exercises showing both markers and color-patterns of the verification indicia when correctly placed in the subtraction receiving area having twenty-five board positions during a subtraction exercise;

FIG. 16B is a plan view of a preferred embodiment of the bottom of twenty-five learning pieces primarily used for addition, subtraction, or multiple-choice exercises showing the addition questions and the subtraction questions of the question/orientation indicia;

FIG. 16C is a plan view of a preferred embodiment of the bottom of twenty-five learning pieces primarily used for addition, subtraction, or multiple-choice exercises showing an alternative preferred embodiment of the subtraction questions of the question/orientation indicia;

FIG. 17A is an alternative plan view of a preferred embodiment of the top of the learning pieces primarily used for addition, subtraction, and multiple-choice exercises showing both markers and color-patterns of the verification indicia when correctly placed in the appropriate receiving area having twenty-five board positions during an addition exercise;

FIG. 18A is an alternative plan view of a preferred embodiment of the top of the learning pieces primarily used for addition, subtraction, and multiple-choice exercises showing both markers and color-patterns of the verification indicia when correctly placed in the appropriate receiving area having twenty-five board positions during a subtraction exercise;

FIG. 18B is an alternative plan view of a preferred embodiment of the bottom of twenty-five learning pieces primarily used for addition, subtraction, or multiple-choice exercises showing the addition questions and the subtraction questions of the question/orientation indicia;

FIG. 19A is a plan view of a preferred embodiment of the top of the learning pieces primarily used for addition, subtraction, and multiple-choice exercises showing both markers and color-patterns of the verification indicia when correctly placed in the appropriate receiving area having twenty-five board positions during a multiple-choice exercise;

FIG. 19B is an alternative plan view of a preferred embodiment of the bottom of twenty-five learning pieces primarily used for addition, subtraction, or multiple-choice exercises showing the addition questions and the subtraction questions of the question/orientation indicia;

FIG. 19C is a plan view of a preferred embodiment of the top of the learning pieces primarily used for addition, subtraction, and multiple-choice exercises showing both markers and color-patterns of the verification indicia when correctly placed in an alternative receiving area having twenty-five board positions during a multiple-choice exercise;

FIG. 19D is an alternative plan view of a preferred embodiment of the bottom of twenty-five learning pieces primarily used for addition, subtraction, or multiple-choice exercises showing the addition questions and the subtraction questions of the question/orientation indicia.

FIG. 21 is a plan view of the board pieces showing on arcuate concave edge, the opposite arcuate convex edge, the scalloped side edge, and the opposite scalloped side edge.

DETAILED DESCRIPTION

Figure 1:
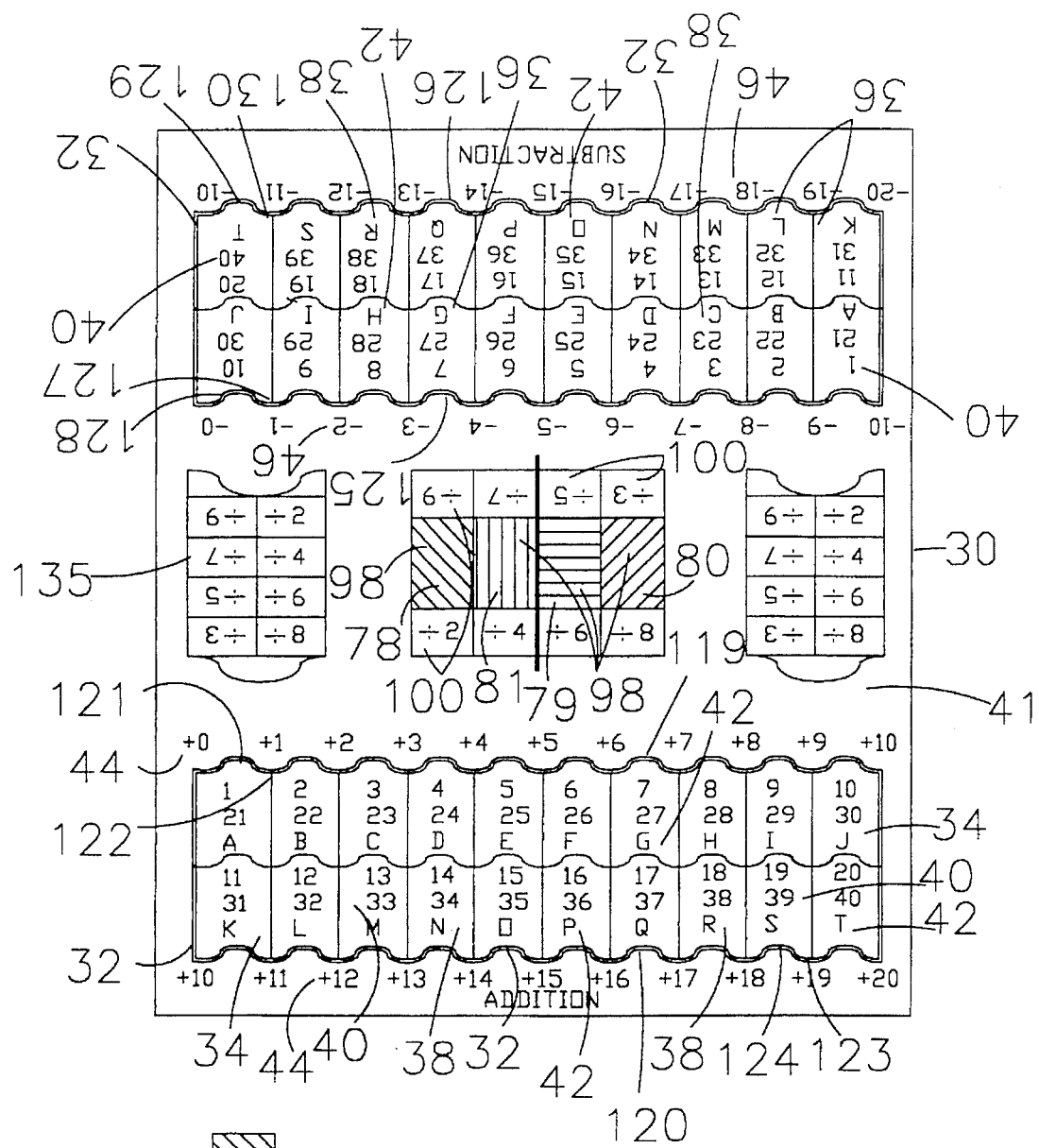
FIG. 1 is a plan view of a preferred embodiment of the learning board showing receiving areas having twenty board positions, constant/confirmation indicia, and constant/orientation indicia.
Figure 8A:
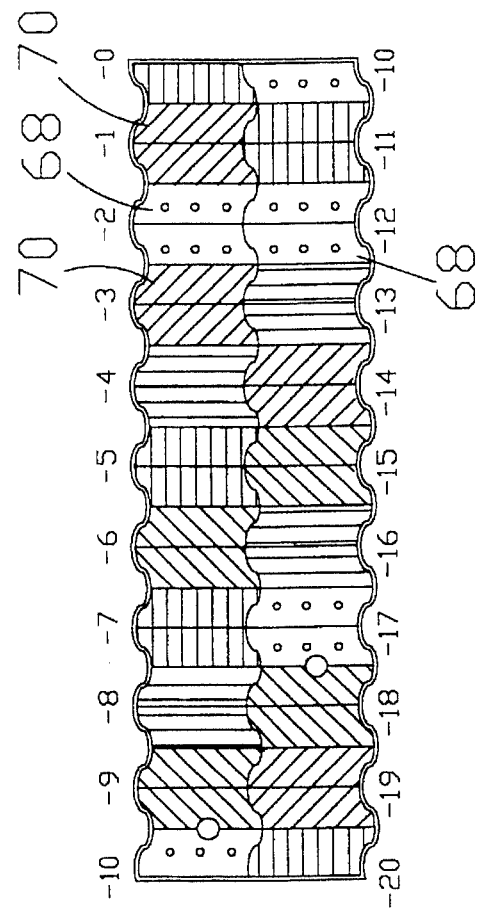
FIG. 8A is an alternative plan view of a preferred embodiment of the top of the learning pieces primarily used for addition, subtraction, or multiple-choice exercises showing both markers and color-patterns of the verification indicia when correctly placed in the appropriate receiving area during a multiple choice exercise.
Figure 8B:
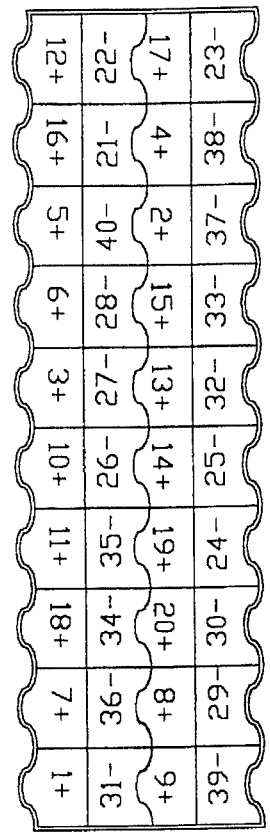
FIG. 8B is an alternative plan view of a preferred embodiment of the bottom of the learning pieces primarily used for addition, subtraction, or multiple-choice exercises showing the addition questions and the subtraction questions of the question/orientation indicia.
Figure 12A:
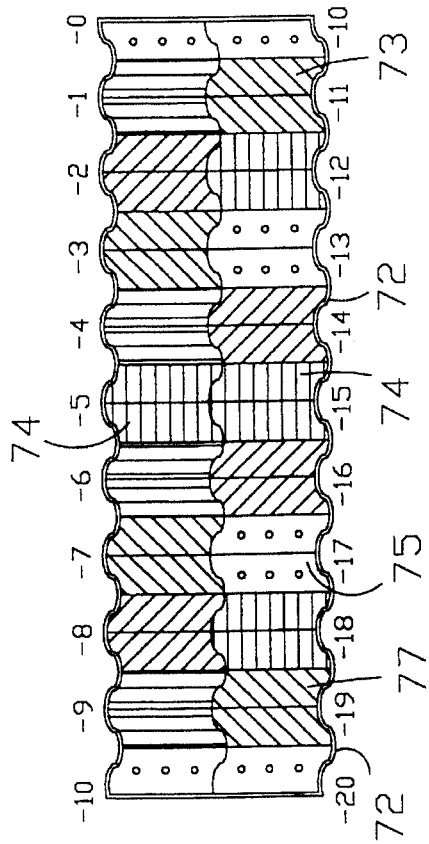
FIG. 12A is a plan view of a preferred embodiment of the top of the learning pieces primarily used for division exercises showing the color-patterns of the verification indicia when correctly placed in the appropriate receiving area during a division exercise.
Figure 12B:
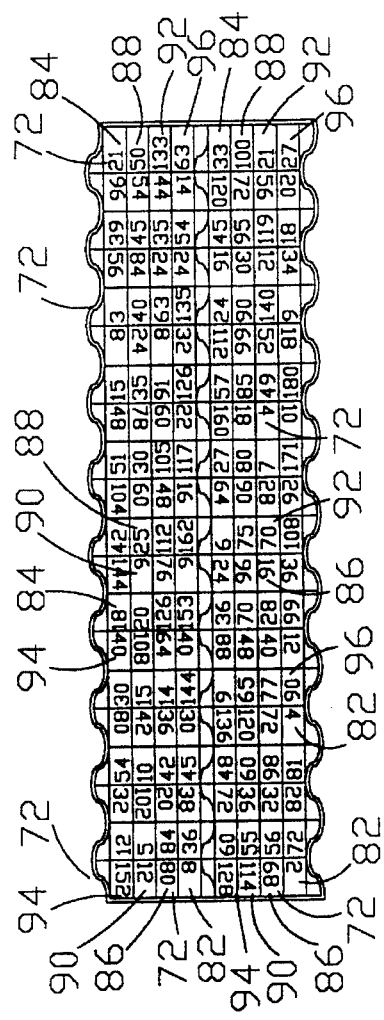
FIG. 12B is a plan view of a preferred embodiment of the bottom of the learning pieces primarily used for division exercises showing the plurality of different orientated division questions of the question/orientation indicia.
Figure 15A:
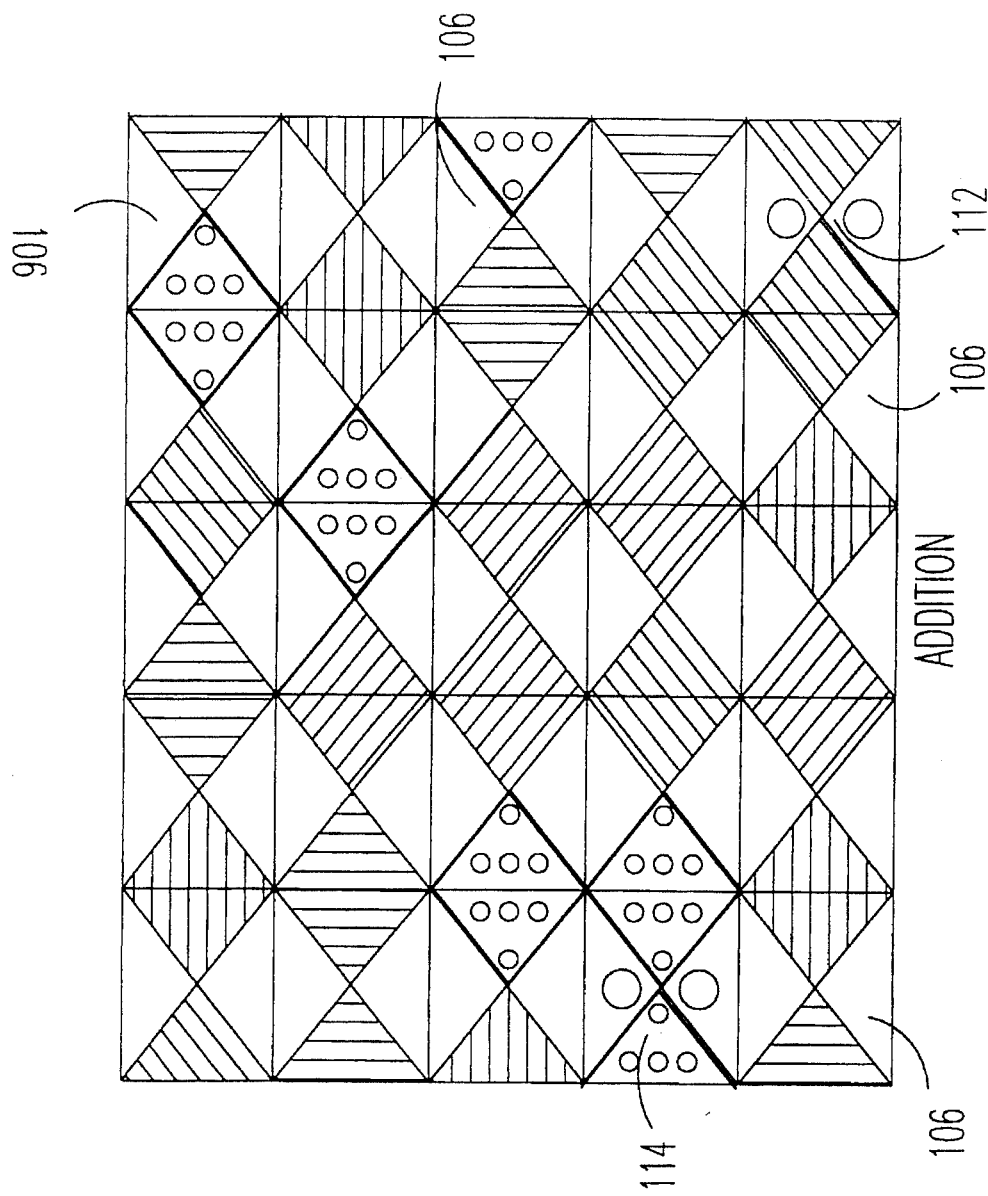
FIG. 15A is a plan view of a preferred embodiment of the top of the learning pieces primarily used for addition, subtraction, and multiple-choice exercises showing both markers and color-patterns of the verification indicia when correctly placed in the appropriate receiving area having twenty-five board positions during an addition exercise.
Figure 15B:
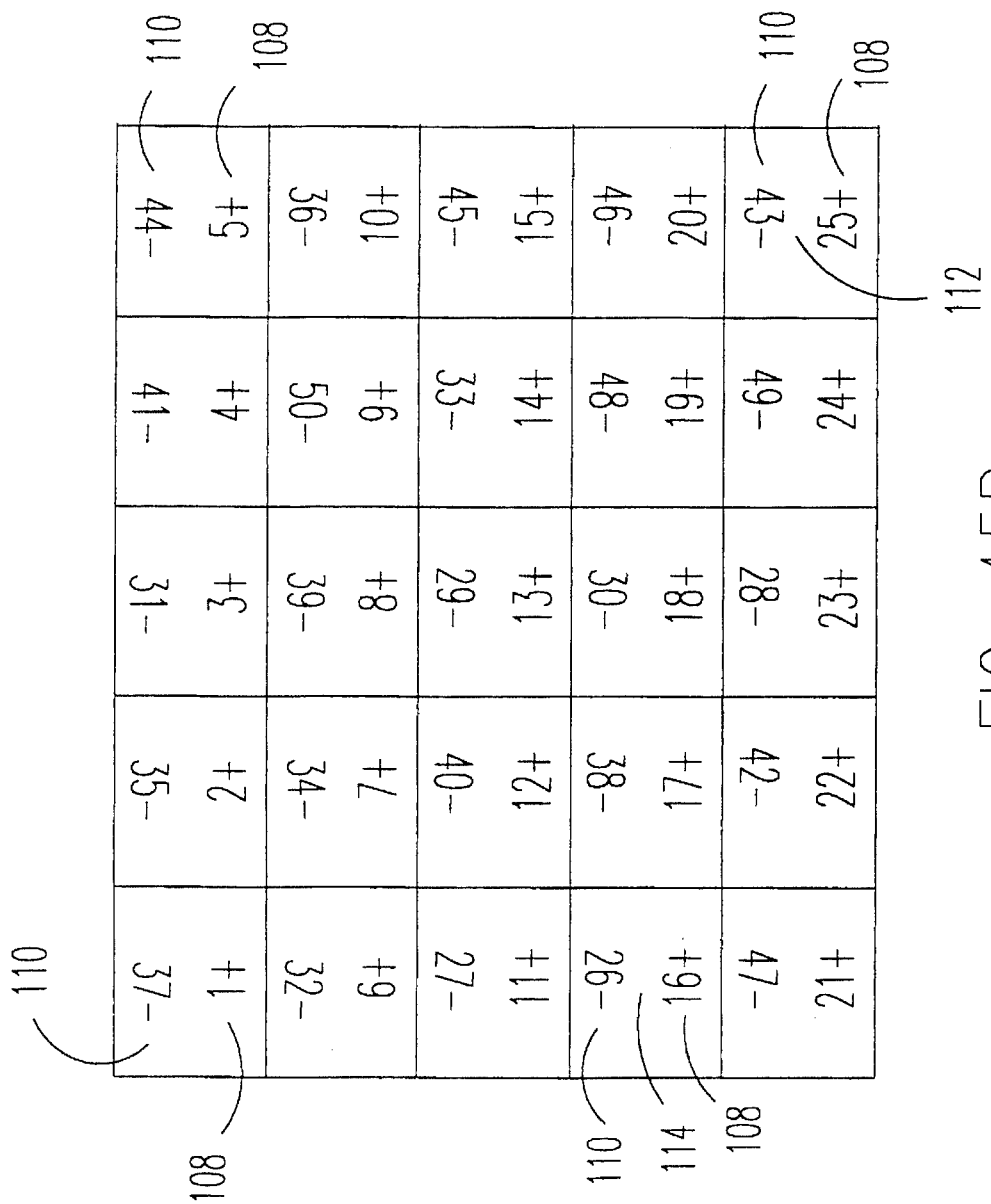
FIG. 15B is a plan view of a preferred embodiment of the bottom of twenty-five learning pieces primarily used for addition, subtraction, or multiple-choice exercises showing the addition questions and subtraction questions of the question/orientation indicia.
Figure 17B:
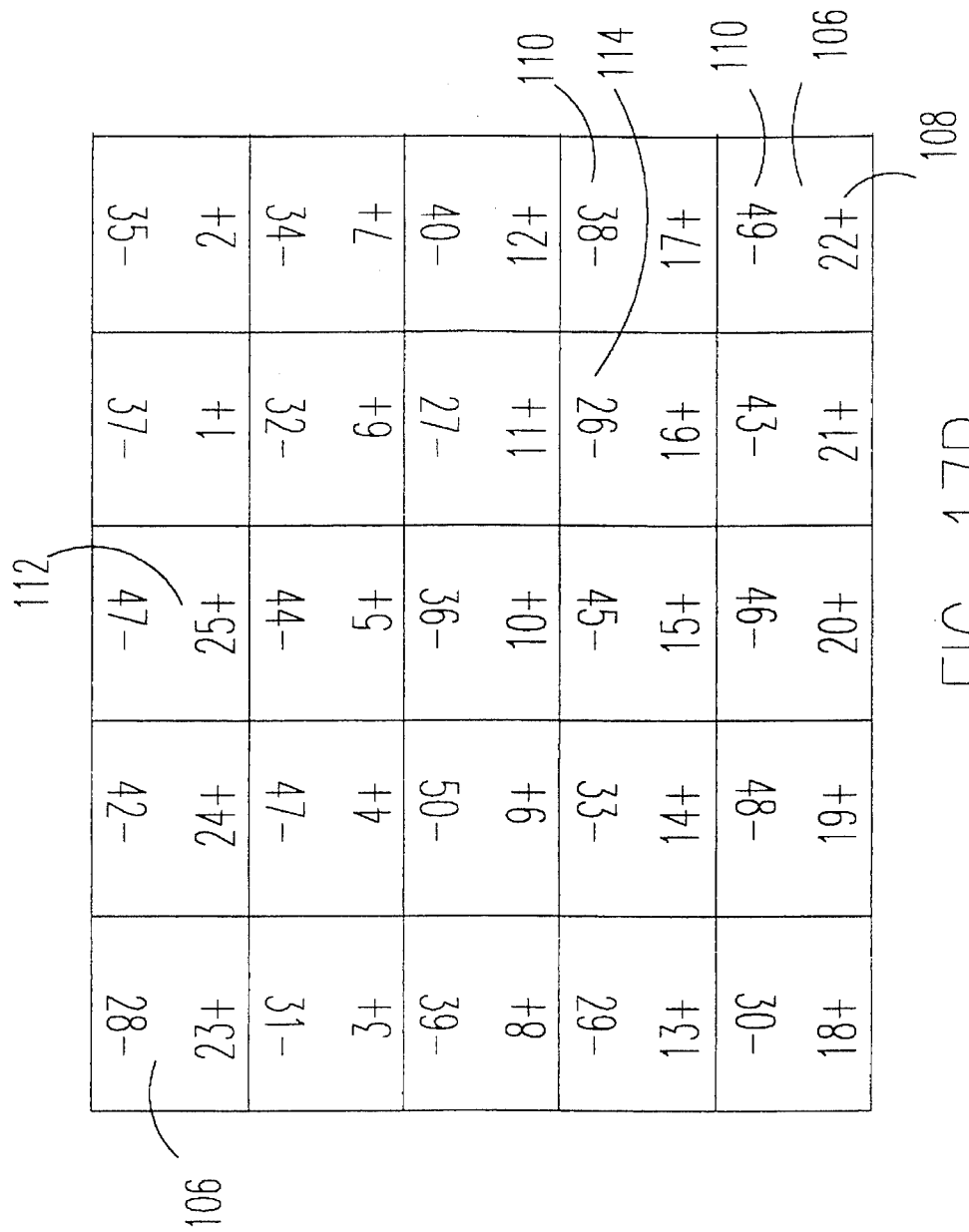
FIG. 17B is an alternative plan view of a preferred embodiment of the bottom of twenty-five learning pieces primarily used for addition, subtraction, or multiple-choice exercises showing the addition questions and the subtraction questions of the question/orientation indicia.

Referring now to the drawings there is shown a preferred embodiment for the learning board 30 of this invention. The learning board 30 is described in connection with pre-mixed multiple choice alphabetical solution lists 31 shown in FIGS. 6A–6J.

The drawings show the learning board 30 comprising a playing surface 41, a plurality of board pieces 48, 72, 106, and a plurality of solution lists 31. The playing surface includes at least two receiving areas, a plurality of constant/confirmation indicia, and a plurality of constant/orientation indicia. The receiving areas having a plurality of answer/orientation indicia. The board pieces 48, 72, 106 include a plurality of question/orientation indicia and a plurality of verification indicia. The solution lists 31 include a plurality of answer numbers 33, a plurality of alphabetical solutions 35, and a plurality of indicator indicia.

The receiving areas preferably include a first receiving area or addition well 34, 102 and a second receiving area or subtraction well 36, 104. In one preferred embodiment, each of the receiving areas include a surface area slightly larger than the surface area occupied by the plurality of board pieces 48, 72 received within each area when the board pieces 48, 72 are correctly positioned in the appropriate receiving area based on a correct solution of an exercise. This slightly larger surface area creates a buffer zone 32 that facilitates the placement and removal of the board pieces 48, 72.

The receiving areas having a plurality of answer/orientation indicia include a plurality of numerical answers 40 and a plurality of alphabetical answers 42. In one preferred embodiment the plurality of numerical answers 40 include the numbers from one to forty and the plurality of alphabetical answers 42 including the letters from A–T. The plurality of answer/orientation indicia forming board positions within each receiving area for placement of the board pieces 48, 72. In one preferred embodiment the board positions 38 include twenty board positions in the addition well 34 and twenty board positions in the subtraction well 36, in another preferred embodiment the board positions include twenty-five board positions in the addition well 102 and and twenty-five board positions in the subtraction well 104.

The plurality of constant/confirmation indicia preferably including a plurality of first numeric indicia and a first non-numeric indicia. The plurality of first numeric indicia include addition constants 44 and subtraction constants 46 preferably located on the edge margin of the appropriate receiving areas. The addition constants 44 are used in an addition mathematical exercise or a multiple-choice excercise and the subtraction constants 46 are used in a subtraction mathematical exercise or a multiple-choice excercise.

The plurality of first non-numeric indicia include a plurality of color codes 98 used in combination with other indicia for confirming the correctness of a solution to a division mathematical exercise. In a preferred embodiment, the plurality of color codes 98 include green 79, yellow 81, brown 78 and blue 80 colors, although different colors could also be used. The plurality of color codes 98 in combination with other indicia provide confirmation of the correctness of a solution to a division mathematical exercise.

The plurality of constant/orientation indicia include a plurality of second numeric indicia and at least one second non-numeric indicia. In a preferred embodiment, the plurality of second numeric indicia include a plurality of different orientated division constants or divisors 100 that are used in division mathematical exercises. The second non-numeric indicia include an orientated representation of a board piece 135.

The orientation of the divisor 100 selected for the exercise in combination with the orientated representation of the board piece 135 determining which of the addition well 34 or the subtraction well 36 is to be used for the division mathematical exercise. In a preferred embodiment, the divisors 100 include the numbers two, three, four, five, six, seven, eight, and nine, although alternative numbers could also be used. The divisor 100, in combination with the plurality of color codes 98 and the verification indicia on the board pieces 72 provides confirmation of the correctness of a solution to a division mathematical exercise.

The plurality of question/orientation indicia on the board pieces 48, 106 include at least one addition question 50, 108 used in an addition mathematical exercise and at least one subtraction question 52, 110 used in a subtraction mathematical exercise.

The plurality of question/orientation indicia on the board pieces 72 includes a plurality of different orientated division questions 82, 84, 86, 88, 90, 92, 94, 96 used in division mathematical exercise, the plurality of different orientated division questions 82, 84, 86, 88, 90, 92, 94, 96 to be divided by divisor 100. In a preferred embodiment, the plurality of different orientated division questions on the board pieces 72 includes a number to be divided by the number two 82, a number to be divided by the number three 84, a number to be divided by the number four 86, a number to be divided by the number five 88, a number to be divided by the number six 90, a number to be divided by the number seven 92, a number to be divided by the number eight 94, and a number to be divided by the number nine 96.

The orientation of the plurality of different orientated division questions corresponding to the orientation of the plurality of different orientated division constants or divisors 100. The position or orientation of the constant divisor 100 selected for the division mathematical exercise with respect to the orientated representation 135 determining which of the plurality of different orientated division questions is used for the division exercise.

The plurality of verification indicia on the plurality of board pieces include a plurality of color patterns and at least one marker 54. In a preferred embodiment, the board pieces 48 used in addition, subtraction, and multiple choice exercises have a plurality of color patterns including a blue color band 56, 60, a red color band 58, 68, a green color band 62, a brown color band 64, and a yellow color band 66 and at least one marker 54, preferably white circles for addition or subtraction exercises. Different colors could also be used for either the color patterns or the markers.

Each board piece in the embodiment of the invention described herein have at least two different color bands. The color bands are selected in combination with the addition question 50, 108 the subtraction question 52, 110, the plurality of numerical answers 40, the plurality of alphabetical answers 42, the addition constants 44, and the subtraction constants 46 such that when the board pieces 48, 106 are correctly placed in the appropriate receiving well based upon a correct solution of an addition, subtraction, or multiple choice exercise, each of the color bands on a board piece 48, 106 match the adjacent color band on an adjoining board piece 48, 106 if any.

Additionally, in a preferred embodiment, when an addition or subtraction exercise has been correctly solved, the board pieces 48 that contain markers 54, are located in the receiving well on adjoining board positions directly adjacent to the addition constants 44 or the subtraction constants 46 selected for the exercise. The addition constant 44 is preferably located on the edge margin of the addition well 34 and the subtraction constant 46 is preferably located on the edge margin of the subtraction well 36. This marker 54, in combination with the alternating matching color bands, provides confirmation of the correctness of a solution to the addition or subtraction mathematical exercise.

In an alternative preferred embodiment, the board pieces 72 used in division mathematical exercises have a plurality of color patterns including a blue color band 73, a red color band 75, a green color band 74, a brown color band 77, and a yellow color band 76, although different colors could also be used. Each board piece has at least two different color bands. The color bands are selected in combination with plurality of different orientated division questions, the plurality of numerical answers 40, the plurality of color codes 98, the plurality of different orientated division constants or divisors 100, and an orientated representation 135 such that when the board pieces 72 are correctly placed in the appropriate receiving area or well based upon a correct solution of a division exercise, each of the color bands on a board piece 72 match the adjacent color band on an adjoining board piece 72, if any.

Additionally in a preferred embodiment, when a division exercise has been correctly solved, a plurality of the board pieces 72 having a color band that matches the color code 98 associated with the selected divisor 100, are located adjacent one another in the receiving well on the adjoining board positions 38 that are substantially centered in the receiving well. This position of the matching color band in combination with the other alternating matching color bands provides confirmation of a correct solution to the division exercise.

Also in a preferred embodiment, when a multiple choice exercise has been correctly solved, a plurality of board pieces 48 having a color pattern or vertical color band that matches the color indicator 37 associated with the pre-mixed multiple choice solution sheet 31 will be the same as a vertical color band formed when the arcuate convex edge 137 of at least two board pieces 48 are received within the arcuate concave edge 136 of at least two other board pieces 48 located close to the addition constant 44 that corresponds to the numerical indicator 39 of the solution sheet 31 selected for the exercise.

The plurality of solution lists 31 include a plurality of answer numbers 33, a plurality of alphabetical solutions 35 and a plurality of indicator indicia. The plurality of indicator indicia preferably including a color indicator 37 and a numerical indicator 39.

In operation, the learning board 30 is orientated with respect to a pupil, such that the plurality of answer/orientation indicia within the appropriate receiving area for the exercise selected is readable. For example, when beginning an exercise on a learning board 30 having twenty board positions 38, the learning board 30 is positioned such that the answer/orientation indicia within the addition well 34 is readable by a pupil. If the learning board 30 is orientated correctly, the addition well 34 should be positioned nearest the pupil and the subtraction well 36 should be positioned furthest away from the pupil.

The board pieces 48, having at least one addition question 50 and one subtraction question 52 on the bottom side, are utilized for the addition exercise. Initially, the board pieces 48 are placed in any position within the subtraction well 36, with the plurality of color patterns facing upwards. The board pieces 48 will not fit exactly within the subtraction well 36 during this first step.

Next, an addition constant 44 to be added to the addition question 50 on the board pieces 48, is selected by either the teacher or the pupil. In a preferred embodiment, the addition constant 44 is selected from the numbers zero through twenty located on the edge margin of the addition well 34. Finally, the board pieces 48 are removed from the subtraction well 36 and turned over to reveal the addition question 50. The addition constant 44 is added to the addition question 50, and the board piece 48 is placed in the addition well 34 at the appropriate board position 38 over the numeric integer 40 that corresponds to the correct answer to the addition problem. This step is repeated until all the board pieces 48 are removed form the subtraction well 36 and placed in the addition well 34.

The board pieces 48 are placed in the addition well 34 with the markers and the plurality of color patterns facing upwards and in a preferred embodiment with the arcuate convex portion of the wavy edge of the addition well 34 being received within the arcuate concave edge of the board piece 48. If the board pieces 48 are correctly placed in the appropriate receiving well based upon a correct solution of the addition exercise, each of the color bands on a board piece 48 match the adjacent color band on an adjoining board piece 48, if any, and the markers will bracket the addition constant 44 previously selected for this exercise.

After an addition exercise, the pupil performs a subtraction exercise before doing another addition exercise. The board pieces 48 are left in the addition well 34 and the learning board 30 is rotated 180 degrees such that the answer/orientation indicia within the subtraction well 36 is readable by a pupil. If the learning board 30 is orientated correctly, the subtraction well 36 should be positioned nearest the pupil and the addition well 34 should be positioned furthest away from the pupil. It will be understood that this arrangement can be varied without changing the scope of the present invention.

The same board pieces 48 are used for both addition and subtraction exercises. The board pieces 48 do not have to be mixed-up before performing the subtraction exercise since they are already substantially disorganized with respect to a subtraction exercise based on a correct solution to an addition exercise in combination with the verification indicia, the question/answer indicia, answer/orientation indica, and the constant/confirmation indicia selected.

A subtraction constant 46, to be subtracted from the subtraction question 52 on the board pieces 48, is selected by either the teacher or the pupil. In a preferred embodiment, the subtraction constant 46 is selected from the numbers zero through twenty located on the edge margin of the subtraction well 36. Finally, the board pieces 48 are removed from the addition well 34 and turned over to reveal the subtraction question 52. The selected subtraction constant 46 is subtracted from the subtraction question 52 and the board piece 48 is placed in the subtraction well 36 at the appropriate board position 38 over the numeric integer 40 that corresponds to the correct answer to the subtraction problem. This step is repeated until the all board pieces 48 are removed from the addition well 34 and placed in the subtraction well 36.

The board pieces 48 are placed in the subtraction well 36 with the markers and the plurality of color patterns facing upwards and in a preferred embodiment with the arcuate convex portion of the wavy edge of the subtraction well 36 being received within the arcuate concave edge of the board piece 48. If the board pieces 48 are correctly placed in the appropriate receiving well based upon a correct solution of the subtraction exercise, each of the color bands on a board piece 48 match the adjacent color band on an adjoining board piece 48, if any, and the markers 54 will bracket the subtraction constant 46 previously selected for this exercise.

Additionally, in a preferred embodiment, substantially all of the edges 136, 137, 138, 139 of the board pieces 48 will match and fit together with the edges 136, 137, 138, 139 of adjoining board pieces 48 and the wavy edges 125, 126 of the subtraction well 36.

After the subtraction exercise, the pupil returns to the addition exercise and repeats the same cycle again with the same or a different addition constant 44 or subtraction constant 46 used each time.

For a division exercise using a learning board 30 having twenty board positions 38, a division constant or divisor, 100 is first chosen by either the teacher or pupil. In a preferred embodiment, the division constant or divisor 100 is selected from the different orientated numbers two through nine. Next, the learning board 30 is positioned such that the divisor 100 is readable by a pupil.

In a preferred embodiment, when the learning board 30 is orientated correctly, the addition well 34 should be positioned nearest the pupil and the subtraction well 36 should be positioned furthest away from the pupil when any of the divisors two, four, six, or eight are chosen. Alternatively, the subtraction well 36 should be positioned nearest the pupil and the addition well 34 should be positioned furthest away from the pupil when any of the divisors three, five, seven, or nine are chosen.

Initially, the board pieces 72 are placed in any position within the well 34 or 36 furthest away from the pupil, with the plurality of color patterns facing upwards. The board pieces 72 will not fit exactly within the well 34 or 36 during this first step. Next, the board pieces 72 are removed from the well, 34 or 36 which is furthest from the pupil and turned over to reveal the plurality of different orientated division questions. The board piece 72 is orientated like the orientated representation 135 on the learning board 30 with the bottom side facing upward.

Once the board piece 72 is properly orientated the appropriate division question from the different orientated division questions can be selected. The position of the divisor 100 selected with respect to the orientated representation 135 translates to a corresponding position and therefore question on the board piece 72. The divisor 100 is divided by the appropriate division question and the board piece 72 is placed in the well, 34 or 36 nearest the pupil at the appropriate board position 38 over the numeric integer 40 that corresponds to the correct answer to the division problem. This step is repeated until all board pieces 72 are removed form the well 34 or 36, farthest away from the pupil and placed in the well 34 or 36, nearest the pupil.

The board pieces 72 are placed in the appropriate well 34 or 36 with the plurality of color patterns facing upwards and in a preferred embodiment with the arcuate convex portion 122 or 124 or 128 or 130 of the wavy edge 119, or 120 or 125 or 126 of the appropriate well 34 or 36 being received within the arcuate concave edge 136 of the board piece 72. When the board pieces 72 are correctly placed in the appropriate receiving well based upon a correct solution of a division exercise, each of the color bands on a board piece 72 match the adjacent color band on an adjoining board piece 72, if any, and the color code 98 associated with the selected divisor 100 will match the color band on the board pieces 72 located in the center of the appropriate well 34 or 36. Also, in a preferred embodiment, substantially all of the edges 136, 137, 138, 139 of the board pieces 72 will match and fit together with the edges 136, 137, 138, 139 of adjoining board pieces 72 and the wavy edges 119, 120, 125, 126 of the appropriate well 34 or 36.

Multiple-choice exercises are performed in a similar manner utilizing one or more of the pre-mixed multiple-choice alphabetical solution lists 31 for each subject taught, as shown in FIGS. 6A–6J. For multiple choice exercises when using a learning board 30 having twenty board positions 38, a set of twenty questions along with a correct answer for each of the twenty questions and multiple incorrect answers for each of the twenty questions are developed by a teacher for a desired subject.

Each of the twenty correct answers has a corresponding alphabetical solution from A–T. The set of twenty questions along with the corresponding correct and incorrect answers developed by the teacher are used in conjunction with a pre-mixed multiple choice alphabetical solution list 31. The pre-mixed alphabetical solution list 31 includes a plurality of answer numbers 33 and a corresponding plurality of pre-selected alphabetical solutions 35 and an plurality of indicator indicia. The plurality of pre-selected alphabetical solutions 35 are matched with the correct answers to the twenty questions developed by the teacher.

The plurality of indicator indicia including a color indicator 37 and a numerical indicator 39. The plurality of indicator indicia in combination with the plurality of color patterns on the board pieces 48 providing an almost instantaneous visual determination of the correctness of the multiple choice exercise and also serving as a reminder of which pre-mixed multiple choice alphabetical solution list 31 was utilized for the exercise.

The set of twenty questions and the pre-mixed alphabetical solution list 31 chosen for any exercise can have questions and answers numbered from one through twenty or from twenty-one through forty. In a preferred embodiment there are two-hundred pre-mixed multiple choice alphabetical solution lists 31, with odd numbered solution lists 31 having answer numbers 33 from one through twenty and even numbered solution lists 31 having answer numbers 33 from twenty-one to forty.

In operation, if the set of twenty questions has answer numbers 33 from one through twenty the addition well 34 is used, if the set of twenty questions has answer numbers 33 from twenty-one through forty the subtraction well 36 is used. For example, when utilizing pre-mixed multiple choice solution list 31 having a numerical indicator 39 of one as shown in the preferred embodiment illustrated in FIG. 6A, the teacher would match the answer for the first question with alphabetical solution C 35, as shown on the solution list 31. The alphabetical solution C 35 from the solution list 31 corresponds with the alphabetical answer 42 at a board position 38 within the addition well 34 of the learning board 30.

Additionally as shown in FIG. 6A, the color indicator 37 for this exercise is brown and the numerical indicator 39 is one. Before beginning the exercise, the learning board 30 is orientated so that the addition well 34 is positioned nearest the pupil and the subtraction well 36 positioned furthest away from the pupil. The student answers each of the questions having answer numbers 33 from one through twenty by placing the board piece 48 having an addition question 50 that corresponds with the answer number 33, in a board position 38 having an alphabetical answer 42 that matches the alphabetical solution 35 for each question. In this example, if question one were answered correctly, the board piece 48 having an addition question 50 of one would be placed in the addition well 34 on a board position 38 having an alphabetical answer 42 of C.

Upon correct completion of the exercise each of the color bands on the board piece 48 match the adjacent color band on an adjoining board piece 48, if any, and the color indicator 37 associated with the pre-mixed multiple choice solution list 31 will be the same as a vertical color band formed when the arcuate convex edge 137 of at least two board pieces 48 are received within the arcuate concave edge 136 of at least two other board pieces 48 located close to the addition constant 44 that corresponds to the numerical indicator 39 of the solution list 31 selected for the exercise. Also, in a preferred embodiment, substantially all edges 136, 137, 138, 139 of the board pieces 48 will match and fit together with the edges 136, 137, 138, 139 of adjoining board pieces 48 and the wavy edges 119, 120, 125, 126 of the appropriate well 34 or 36.

For the next exercise, a solution list 31 having answer numbers 33 from twenty-one through forty is used, such as number two shown in the preferred embodiment illustrated in FIG. 6A. The board pieces 48 are left in the addition well 34 and the learning board 30 is rotated 180 degrees such that the answer/orientation indicia within the subtraction well 36 is readable by a pupil. If the learning board 30 is orientated correctly, the subtraction well 36 should be positioned nearest the pupil and the addition well 34 should be positioned furthest away from the pupil. The same board pieces 48 are used for all multiple choice exercises. The board pieces 48 do not have to be mixed-up before performing the next multiple choice exercise since they are already substantially disorganized with respect to this multiple choice exercise based on a correct solution to the previous multiple choice exercise and the selection of another pre-mixed multiple choice solution list 31. The pupil merely repeats the same procedure again and again, each time alternating between the addition well 34 and the subtraction well 36.

Figure 20:
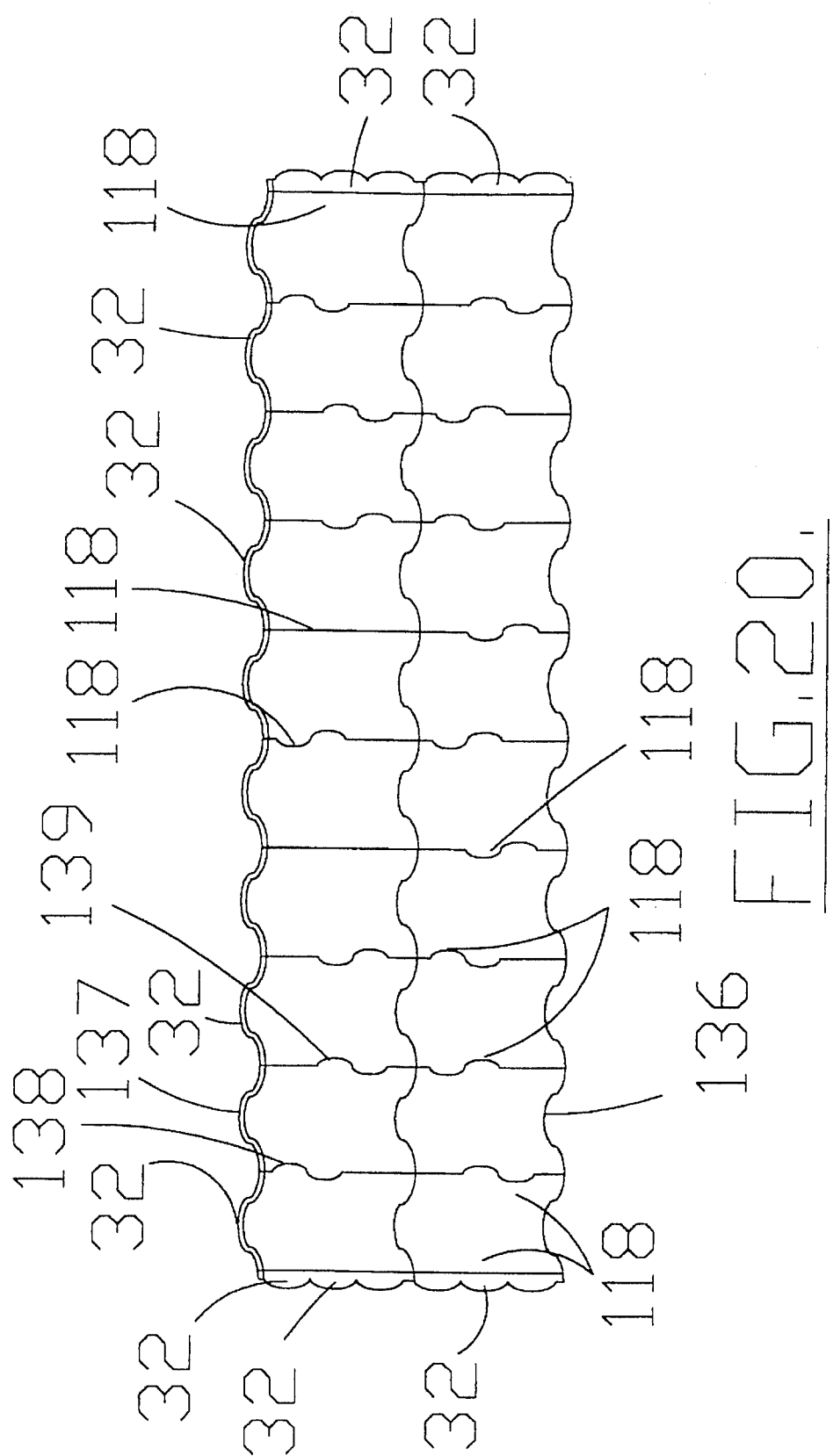
FIG. 20 is a plan view of a preferred embodiment of a receiving area showing an arcuate concave edge and an opposite arcuate convex edge, and additionally illustrating the shape of the arcuate concave edge, the opposite arcuate convex edge, the scalloped side edge, and the opposite scalloped side edge of a preferred embodiment of the board pieces received within the receiving area.

In a preferred embodiment of the learning board, the wells 34, 36 are recessed into the playing surface and have a wavy edge 119, 125 and an opposite wavy edge 120, 126. The wavy edges 119, 120, 125, 126 have a plurality of alternating arcuate concave portions 121, 123, 127, 129, and convex portions 122, 124, 128, 130, for receiving board pieces 48, 72 having an arcuate concave edge 136, and an opposite arcuate convex edge 137. Additionally, the board pieces 48, 72 can have coded edges preferably a scalloped side edge 138 and an opposite scalloped side edge 139 such that the board pieces 48, 72 are received within the well 34, 36 in jigsaw puzzle-like fashion allowing for substantial congruency between the wells 34, 36 and the board pieces 48, 72 when any of the mathematical or non-mathematical exercises are correctly solved. A preferred type of edge coding 118 for the board pieces 48, 72 is illustrated in the receiving area shown in FIG. 20.

While specific embodiments have been shown and described, many variations are possible. The particular shape, dimensions, and composition of the learning board may be changed as desired to suit the conditions in which it is used. It will be understood by one skilled in the art that although a learning board for performing addition, subtraction, division, and multiple choice exercises is specifically described, a learning board for performing only addition and subtraction excercises or a learning board for performing only division excercises are alternative preferred embodiments.

Having described the invention in detail, those skilled in the art will appreciate that modifications may be made of the invention without departing from its spirit. Therefore, it is not intended that the scope of the invention be limited to the specific embodiments illustrated and described. Rather, it is intended that the scope of this invention be determined by the appended claims and their equivalents.

What is claimed is:

1. A learning board for performing addition and subtraction exercises comprising:

a playing surface including at least two receiving areas located within the same horizontal plane, and a plurality of constant/confirmation indicia, the receiving areas including a plurality of answer/orientation indicia, the plurality of answer/orientation indicia including a plurality of board positions; and a plurality of board pieces having a top and a bottom, the top of the board pieces including a plurality of verification indicia, the bottom of the board pieces including a plurality of question/orientation indicia, the plurality of board pieces positionable on the board positions of the receiving areas.

2. The learning board of claim 1 wherein the plurality of answer/orientation indicia includes a plurality of numerical answers.

3. The learning board of claim 1 wherein the plurality of constant/confirmation indicia includes a plurality of first numeric indicia.

4. The learning board of claim 3 wherein the plurality of first numeric indicia includes a plurality of addition constants and a plurality of subtraction constants.

5. The learning board of claim 3 wherein the plurality of first numeric indicia are located on an edge margin of the receiving areas.

6. The learning board of claim 1 wherein the playing surface includes a back member having a top and a bottom, the top of the back member including the plurality of answer/orientation indicia, the plurality of answer/orientation indicia including the plurality of board positions, the playing surface further including a front member having a first opening and a second opening, the openings both having a first wavy edge and an opposite second wavy edge, the front member including a top and a bottom, the top of the front member including the plurality of constant/confirmation indicia, the bottom of the front member attached to the top of the back member, partially closing the openings and thereby forming at least two receiving trays.

7. The learning board of claim 6 wherein the first wavy edge of both the first opening and the second opening includes a plurality of first alternating arcuate concave portions and a plurality of adjacent first alternating arcuate convex portions, and the opposite second wavy edge of both the first and second openings includes a corresponding plurality of second alternating arcuate convex portions opposite the first alternating arcuate concave portions of the first wavy edge, and a corresponding plurality of adjacent second alternating arcuate concave portions opposite the adjacent first alternating arcuate convex portions of the first wavy edge.

8. The learning board of claim 6 wherein each of the receiving trays has a surface area that is slightly larger than a surface area occupied by the plurality of board pieces received within each of the trays when the board pieces are correctly positioned in the appropriate receiving tray based on a correct solution of an exercise, such that the slightly larger surface area creates a buffer zone that facilitates the placement and removal of the board pieces.

9. The learning board of claim 1 wherein the plurality of board pieces includes an arcuate concave edge and an opposite arcuate convex edge.

10. The learning board of claim 9 wherein the arcuate convex edge of the board piece is received within the arcuate concave edge of another board piece such that there is substantial congruency when the board pieces are correctly positioned in the appropriate receiving area based on a correct solution of an exercise.

11. The learning board of claim 1 wherein the receiving areas include a first receiving area and a second receiving area.

12. The learning board of claim 1 wherein the plurality of verification indicia, with respect to each board pieces, is determined in combination with the plurality of question/orientation indicia, the plurality of answer/orientation indicia, and the plurality of constant/confirmation indicia such that when the board pieces are correctly positioned in an appropriate receiving area based on a correct solution of an exercise, the plurality of verification indicia provide an almost instantaneous visual determination of the correctness of the exercise and substantially disorganizes the board pieces with respect to an alternative receiving area used for a subsequent exercise.

13. The learning board of claim 1 wherein the plurality of verification indicia includes a plurality of color-patterns and at least one marker.

14. The learning board of claim 1 wherein the plurality of question/orientation indicia includes at least one addition question and at least one subtraction question.

15. The learning board of claim 1 wherein the plurality of board pieces have a scalloped side edge and an opposite scalloped side edge such that there is substantial congruency when the scalloped side edge of a board piece is received within the corresponding scalloped side edge of another board piece when the board pieces are correctly positioned in the appropriate receiving area based on a correct solution of an exercise.

16. The learning board of claim 15 wherein the scalloped side edge and the opposite scalloped side edge of the plurality of board pieces include a plurality of patterns such that the scalloped side edge and the opposite scalloped side edge of the same board piece have a different pattern.

17. The learning board of claim 1 wherein the plurality of board positions include twenty board positions within each receiving area.

18. The learning board of claim 1 wherein the plurality of board positions include twenty-five board positions within each receiving area.

19. A learning board for performing division exercises comprising:

a playing surface including at least two receiving areas located within the same horizontal plane, a plurality of constant/confirmation indicia and a plurality of constant/orientation indicia, the receiving areas including a plurality of answer/orientation indicia, the plurality of answer/orientation indicia including a plurality of board positions; and a plurality of board pieces having a top and a bottom, the top of the board pieces including a plurality of verification indicia, the bottom of the board pieces including a plurality of question/orientation indicia, the plurality of board pieces positionable on the board positions of the receiving areas.

20. The learning board of claim 19 wherein the plurality of answer/orientation indicia includes a plurality of numerical answers.

21. The learning board of claim 19 wherein the plurality of constant/confirmation indicia includes a plurality of first non-numeric indicia.

22. The learning board of claim 21 wherein the plurality of first non-numeric indicia includes a plurality of color-codes.

23. The learning board of claim 19 wherein the plurality of constant/orientation indicia includes a plurality of second numeric indicia and at least one second non-numeric indicia.

24. The learning board of claim 23 wherein the plurality of second numeric indicia includes a plurality of different orientated division constants.

25. The learning board of claim 23 wherein the second non-numeric indicia includes an orientated representation of a board piece.

26. The learning board of claim 19 wherein the playing surface includes a back member having a top and a bottom, the top of the back member including the plurality of answer/orientation indicia, the plurality of answer/orientation indicia including the plurality of board positions, the playing surface further including a front member having a first opening and a second opening, the openings both having a first wavy edge and an opposite second wavy edge, the front member including a top and a bottom, the top of the front member including the plurality of constant/confirmation indicia, and the plurality of constant/orientation indicia, the bottom of the front member attached to the top of the back member, partially closing the openings and thereby forming at least two receiving trays.

27. The learning board of claim 26 wherein the first wavy edge of both the first opening and the second opening includes a plurality of first alternating arcuate concave portions and a plurality of adjacent first alternating arcuate convex portions, and the opposite second wavy edge of both the first and second openings includes a corresponding plurality of second alternating arcuate convex portions opposite the first alternating arcuate concave portions of the first wavy edge, and a corresponding plurality of adjacent second alternating arcuate concave portions opposite the adjacent first alternating arcuate convex portions of the first wavy edge.

28. The learning board of claim 26 wherein the receiving trays each have a surface area that is slightly larger than a surface area occupied by the plurality of board pieces received within each tray when the board pieces are correctly positioned in the appropriate receiving tray based on a correct solution of an exercise, such that the slightly larger surface area creates a buffer zone that facilitates the placement and removal of the board pieces.

29. The learning board of claim 19 Wherein the plurality of board pieces includes an arcuate concave edge and an opposite arcuate convex edge.

30. The learning board of claim 29 wherein the arcuate convex edge of the board piece is received within the arcuate concave edge of another board piece such that there is substantial congruency when the board pieces are correctly positioned in the appropriate receiving area based on a correct solution of an exercise.

31. The learning board of claim 19 wherein the receiving areas include a first receiving area and a second receiving area.

32. The learning board of claim 19 wherein the plurality of verification indicia, with respect to each board pieces, is determined in combination with the plurality of question/orientation indicia, the plurality of answer/orientation indicia, the plurality of constant/confirmation indicia, and the plurality of constant/orientation indicia such that when the board pieces are correctly positioned in an appropriate receiving area based on a correct solution of an exercise, such that the plurality of verification indicia provides an almost instantaneous visual determination of the correctness of the exercise and substantially disorganizes the board pieces with respect to an alternative receiving area used for a subsequent exercise.

33. The learning board of claim 19 wherein the plurality of verification indicia includes a plurality of color-patterns.

34. The learning board of claim 19 wherein the plurality of question/orientation indicia on the bottom of the plurality of board pieces includes a plurality of different orientated division questions.

35. The learning board of claim 19 wherein the plurality of board pieces have a scalloped side edge and an opposite scalloped side edge such that there is substantial congruency when the scalloped side edge of a board piece is received within the corresponding scalloped side edge of another board piece when the board pieces are correctly positioned in the appropriate receiving area based on a correct solution of an exercise.

36. The learning board of claim 35 wherein the scalloped side edge and the opposite scalloped side edge of the plurality of board pieces include a plurality of patterns such that the scalloped side edge and the opposite scalloped side edge of the same board piece have a different pattern.

37. The learning board of claim 19 wherein the plurality of board positions include twenty board positions within each receiving area.

38. The learning board of claim 19 wherein the plurality of board positions include twenty-five board positions within each receiving area.

39. A learning board in combination with a plurality of solution lists for performing addition, subtraction, division, and multiple choice exercises comprising:

a playing surface including at least two receiving areas located within the same horizontal plane, a plurality of constant/confirmation indicia and a plurality of constant/orientation indicia, the receiving areas including a plurality of answer/orientation indicia, the plurality of answer/orientation indicia including a plurality of board positions;

a plurality of board pieces having a top and a bottom, the top of the board pieces including a plurality of verification indicia, the bottom of the board pieces including a plurality of question/orientation indicia, the plurality of board pieces positionable on the board positions of the receiving areas; and a plurality of solution lists including a plurality of answer numbers, a plurality of alphabetical solutions and a plurality of indicator indicia.

40. The learning board in combination with the plurality of solution lists of claim 39 wherein the plurality of answer/orientation indicia includes a plurality of numerical answers and a plurality of alphabetical answers.

41. The learning board in combination with the plurality of solution lists of claim 39 wherein the plurality of constant/confirmation indicia includes a plurality of first numeric indicia and a plurality of first non-numeric indicia.

42. The learning board in combination with the plurality of solution lists of claim 41 wherein the plurality of first numeric indicia includes a plurality of addition constants and a plurality of subtraction constants.

43. The learning board in combination with the plurality of claim 41 wherein the plurality of first numeric indicia are located on an edge margin of the receiving areas.

44. The learning board in combination with the plurality of solution lists of claim 39 wherein the plurality of first non-numeric indicia includes a plurality of color-codes.

45. The learning board in combination with the plurality of solution lists of claim 39 wherein the plurality of constant/ orientation indicia includes a plurality of second numeric indicia and at least one second non-numeric indicia.

46. The learning board in combination with the plurality of solution lists of claim 45 wherein the plurality of second numeric indicia includes a plurality of different orientated division constants.

47. The learning board in combination with the plurality of solution lists of claim 45 wherein the second non-numeric indicia includes an orientated representation of a board piece.

48. The learning board in combination with the plurality of solution lists of claim 39 wherein the playing surface includes a back member having a top and a bottom, the top of the back member including the plurality of answer/ orientation indicia, the plurality of answer/orientation indicia including the plurality of board positions, the playing surface further including a front member having a first opening and a second opening, the openings both having a first wavy edge and an opposite second wavy edge, the front member including a top and a bottom, the top of the front member including the plurality of constant/confirmation indicia, and the plurality of constant/orientation indicia, the bottom of the front member attached to the top of the back member, partially closing the openings and thereby recessing forming at least two receiving trays.

49. The learning board in combination with the plurality of solution lists of claim 48 wherein the first wavy edge of both the first opening and the second opening includes a plurality of first alternating arcuate concave portions and a plurality of adjacent first alternating arcuate convex portions, and the opposite second wavy edge of both the first and second openings includes a corresponding plurality of second alternating arcuate convex portions opposite the first alternating arcuate concave portions of the first wavy edge, and a corresponding plurality of adjacent second alternating arcuate concave portions opposite the adjacent first alternating arcuate convex portions of the first wavy edge.

50. The learning board in combination with the plurality of solution lists of claim 48 wherein the receiving trays each have a surface area that is slightly larger than a surface area occupied by the plurality of board pieces received within each tray when the board pieces are correctly positioned in the appropriate receiving tray based on a correct solution of an exercise, such that the slightly larger surface area creates a buffer zone that facilitates the placement and removal of the board pieces.

51. The learning board in combination with the plurality of solution lists of claim 39 wherein the plurality of board pieces includes an arcuate concave edge and an opposite arcuate convex edge.

52. The learning board in combination with the plurality of solution lists of claim 51 wherein the arcuate convex edge of the board piece is received within the arcuate concave edge of another board piece such that there is substantial congruency when the board pieces are correctly positioned in the appropriate receiving area based on a correct solution of an exercise.

53. The learning board in combination with the plurality of solution lists of claim 39 wherein the receiving areas include a first receiving area and a second receiving area.

54. The learning board in combination with the plurality of solution lists of claim 39 wherein the plurality of verification indicia, with respect to each board pieces, is determined in combination with the plurality of question/orientation indicia, the plurality of answer/orientation indicia, the plurality of constant/confirmation indicia, the plurality of constant/orientation indicia, and the plurality of solution lists such that when the board pieces are correctly positioned in an appropriate receiving area based on a correct solution of an exercise, such that the plurality of verification indicia provides an almost instantaneous visual determination of the correctness of the exercise and substantially disorganizes the board pieces with respect to an alternative receiving area used for a subsequent exercise.

55. The learning board in combination with the plurality of solution lists of claim 39 wherein the plurality of verification indicia includes a plurality of color-patterns and at least one marker.

56. The learning board in combination with the plurality of solution lists of claim 39 wherein the plurality of question/orientation indicia includes at least one addition question and at least one subtraction question such that the plurality of board pieces can be used for either an addition, a subtraction, or a multiple choice exercise.

57. The learning board in combination with the plurality of solution lists claim 39 wherein the plurality of question/ orientation indicia includes a plurality of different orientated division questions such that the board pieces can be used for a division exercise.

58. The learning board in combination with the plurality of solution lists of claim 39 wherein the plurality of board pieces have a scalloped side edge and an opposite scalloped side edge such that there is substantial congruency when the scalloped side edge of a board piece is received within the corresponding scalloped side edge of another board piece when the board pieces are correctly positioned in the appropriate receiving area based on a correct solution of an exercise.

59. The learning board in combination with the plurality of solution lists of claim 58 wherein the scalloped side edge and the opposite scalloped side edge of the plurality of board pieces include a plurality of patterns such that the scalloped side edge and the opposite scalloped side edge of the same board piece have a different pattern.

60. The learning board in combination with the plurality of solution lists of claim 39 wherein the plurality of indicator indicia include a color indicator and a numerical indicator.

61. The learning board in combination with the plurality of solution lists of claim 39 wherein the plurality of board positions include twenty board positions within each receiving area.

62. The learning board in combination with the plurality of solution lists of claim 39 wherein the plurality of board positions include twenty-five board positions within each receiving area.

* * * * *